(12) United States Patent
Twitchell, Jr.

(10) Patent No.: US 10,686,708 B2
(45) Date of Patent: *Jun. 16, 2020

(54) VIRTUAL DISPERSIVE NETWORKING SYSTEMS AND METHODS

(71) Applicant: DISPERSIVE NETWORKS, INC., Alpharetta, GA (US)

(72) Inventor: Robert W. Twitchell, Jr., Alpharetta, GA (US)

(73) Assignee: DISPERSIVE NETWORKS, INC., Alpharetta, GA (US)

( * ) Notice: Subject to any disclaimer, the term of this patent is extended or adjusted under 35 U.S.C. 154(b) by 129 days.

This patent is subject to a terminal disclaimer.

(21) Appl. No.: 15/671,053

(22) Filed: Aug. 7, 2017

(65) Prior Publication Data
US 2018/0024857 A1 Jan. 25, 2018

Related U.S. Application Data

(63) Continuation of application No. 14/750,956, filed on Jun. 25, 2015, now Pat. No. 9,727,367, which is a
(Continued)

(51) Int. Cl.
*H04L 12/803* (2013.01)
*H04L 12/801* (2013.01)
(Continued)

(52) U.S. Cl.
CPC ........ *H04L 47/125* (2013.01); *G06F 9/45558* (2013.01); *H04L 41/00* (2013.01);
(Continued)

(58) Field of Classification Search
CPC . G06F 2009/45562; G06F 2009/45595; G06F 2009/45558; H04L 41/00;
(Continued)

(56) References Cited

U.S. PATENT DOCUMENTS 9,071,607 B2 * 6/2015 Twitchell, Jr. ........ H04L 45/586
9,246,801 B1 * 1/2016 Kompella .............. H04L 45/50
(Continued)

*Primary Examiner* — Alina A Boutah
(74) *Attorney, Agent, or Firm* — Tillman Wright, PLLC; Chad D. Tillman; Jeremy C. Doerre

(57) ABSTRACT

A method for network communications from a first device to a second device includes communicating data from the first device to the second device by spawning a first virtual machine for a first network connection that virtualizes network capabilities of the electronic device, and using the virtualized network capabilities of the first virtual machine, transmitting a plurality of packets for communication to a first network address and port combination associated with the second device. The method further includes repeatedly changing to a respective another network address and port combination by repeatedly spawning a respective another virtual machine for a respective another network connection that virtualizes network capabilities of the electronic device, and using the virtualized network capabilities of the spawned respective another virtual machine, transmitting a plurality of packets for communication to the respective another network address and port combination associated with the second device.

12 Claims, 38 Drawing Sheets

Presence and Connection Processing ← – – ▶

Data Path ◀————▶

Related U.S. Application Data continuation of application No. 13/844,464, filed on Mar. 15, 2013, now Pat. No. 9,071,607, which is a continuation-in-part of application No. 13/007,595, filed on Jan. 14, 2011, now Pat. No. 8,560,634, which is a continuation-in-part of application No. 12/499,075, filed on Jul. 7, 2009, now Pat. No. 8,539,098, which is a continuation-in-part of application No. 12/253,926, filed on Oct. 17, 2008, now Pat. No. 7,895,348.

(60) Provisional application No. 61/696,770, filed on Sep. 4, 2012, provisional application No. 61/133,935, filed on Jul. 7, 2008, provisional application No. 60/999,603, filed on Oct. 17, 2007.

(51) Int. Cl.

| | | |
|---|---|---|
| *H04L 29/08* | (2006.01) | |
| *H04L 29/06* | (2006.01) | |
| *H04L 12/713* | (2013.01) | |
| *H04L 12/24* | (2006.01) | |
| *G06F 9/455* | (2018.01) | |
| *H04W 4/21* | (2018.01) | |
| *H04W 4/18* | (2009.01) | |
| *H04L 12/26* | (2006.01) | |
| *H04L 12/853* | (2013.01) | |

(52) U.S. Cl.
CPC ........ *H04L 41/0896* (2013.01); *H04L 43/028* (2013.01); *H04L 45/586* (2013.01); *H04L 47/15* (2013.01); *H04L 47/2416* (2013.01); *H04L 67/06* (2013.01); *H04L 67/10* (2013.01); *H04L 67/14* (2013.01); *H04L 67/141* (2013.01); *H04L 69/32* (2013.01); *H04W 4/18* (2013.01); *H04W 4/21* (2018.02); *G06F 2009/45562* (2013.01); *G06F 2009/45595* (2013.01); *H04L 69/14* (2013.01); *H04L 69/18* (2013.01)

(58) Field of Classification Search
CPC . H04L 41/0896; H04L 43/028; H04L 45/586; H04L 45/04; H04L 45/507; H04L 45/748; H04L 47/15; H04L 47/2416; H04L 67/06; H04L 67/10; H04L 67/14; H04L 67/141; H04L 69/32; H04W 4/18; H04W 4/21
See application file for complete search history.

(56) References Cited

U.S. PATENT DOCUMENTS

| | | | |
|---|---|---|---|
| 2005/0030951 A1* | 2/2005 | Maciocco | H04Q 11/0066 370/395.2 |
| 2006/0262735 A1* | 11/2006 | Guichard | H04L 12/66 370/254 |
| 2007/0121638 A1* | 5/2007 | Szczebak, Jr. | H04L 12/2856 370/394 |
| 2007/0121656 A1* | 5/2007 | Heidari-Bateni | H04L 12/2805 370/402 |
| 2007/0189298 A1* | 8/2007 | Wong | H04L 47/15 370/395.1 |
| 2012/0155349 A1* | 6/2012 | Bajic | H04W 4/80 370/311 |
| 2013/0170435 A1* | 7/2013 | Dinan | H04L 45/50 370/328 |
| 2014/0019604 A1* | 1/2014 | Twitchell, Jr. | H04L 45/586 709/223 |
| 2015/0009806 A1* | 1/2015 | Bashandy | H04L 41/0654 370/221 |

* cited by examiner

Table 1

Layer 2

| Bytes | Description |
|---|---|
| 6 : | Destination MAC Address |
| 6 : | Source MAC Address |

Layer 3

| Bytes | Description |
|---|---|
| 1 : | Version |
| 1 : | Type of Service |
| 1 : | Time to Live, Control Flag |
| 1 : | Protocol Number |
| 4-16 : | Destination IP Address |
| 4-16 : | Source IP Address |

Layer 4

| Bytes | Description |
|---|---|
| 2 : | Source Port |
| 2 : | Destination Port |
| 1 : | TCP Flag |

Layer 5

| Bytes | Description |
|---|---|
| 2 : | DNI Flag |
| 4 : | DNI SHA-1/MD5 Hash |

*FIG. 6*

| Download Requests | Potential Downloads completed by Client | Percent Reduction in Resources |
|---|---|---|
| 1 | 0 | 0% |
| 2 | 1 | 50% |
| 3 | 2 | 66.67% |
| 4 | 3 | 75% |
| 5 | 4 | 80% |

Table 9

FIG. 10

OS – Operating System
TVM – Thin Virtual Machine
VM – Virtual Machine
VDRC – Virtual Dispersive Routing Client
VDRS – Virtual Dispersive Routing Server VDR Client and Server Architectures Direct Spreading of Packets Hopping IP Address and Port

VIRTUAL DISPERSIVE NETWORKING SYSTEMS AND METHODS

CROSS-REFERENCE TO RELATED APPLICATION

The present application is U.S. continuation patent application of, and claims priority under 35 U.S.C. § 120 to, U.S. nonprovisional patent application Ser. No. 13/844,464, filed Mar. 15, 2013, which '464 application is incorporated herein by reference and which '464 application a U.S. nonprovisional patent application of, and claims priority under 35 U.S.C. § 119(e) to, U.S. provisional patent application Ser. No. 61/696,770, filed Sep. 4, 2012, which provisional patent application is incorporated by reference herein. The present application also is a U.S. continuation-in-part patent application of, and claims priority under 35 U.S.C. § 120 to, U.S. nonprovisional patent application Ser. No. 13/007,595, filed Jan. 14, 2011, which '595 application is a U.S. continuation-in-part application of, and claims priority under 35 U.S.C. § 120 to, U.S. nonprovisional patent application Ser. No. 12/499,075, filed Jul. 7, 2009, (i) which '075 application is a U.S. continuation-in-part application of, and claims priority under 35 U.S.C. § 120 to, U.S. nonprovisional patent application Ser. No. 12/253,926, filed Oct. 17, 2008, which '926 application is a U.S. nonprovisional patent application of, and claims priority under 35 U.S.C. § 119(e) to, U.S. provisional patent application Ser. No. 60/999,603, filed Oct. 17, 2007, and which '926 application is a U.S. non-provisional patent application of, and claims priority under 35 U.S.C. § 119(e) to, U.S. provisional patent application Ser. No. 61/133,935, filed Jul. 7, 2008; and (ii) which '075 application is a U.S. nonprovisional patent application of, and claims priority under 35 U.S.C. § 119(e) to, U.S. provisional patent application Ser. No. 61/133,935, filed Jul. 7, 2008. The present application also incorporates herein by reference U.S. patent application Ser. No. 12/499,075, filed Jul. 7, 2009 and corresponding publication U.S. 2010/0009758; U.S. patent application Ser. No. 12/253,926, filed Oct. 17, 2008, and corresponding publication U.S. 2009/0106439 and U.S. Pat. No. 7,895,348 (the "Incorporated Patent Disclosures"). The Incorporated Patent Disclosures disclose and describe technologies that are utilized in connection with aspects, features, and embodiments of the invention, including virtual dispersive networking and virtual dispersive routing technologies. To the extent necessary, and where applicable if anywhere herein, these incorporated publications and patent are relied upon in satisfying 35 U.S.C. § 112, 91 and 96. The present application also hereby incorporates herein by reference the entire disclosure of Exhibits 1 and 2 of the Appendix attached hereto.

COPYRIGHT STATEMENT

All of the material in this patent document is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

BACKGROUND OF THE INVENTION

The present invention generally relates to network routing and network communications.

Conventional networks, such as the Internet, rely heavily on centralized routers to perform routing tasks in accomplishing network communications. The vulnerability and fragility of these conventional networks make entities feel insecure about using them.

Further, network attacks are a common occurrence in today's cyber environment. Computers that are not protected by firewalls are under constant attack. Servers are especially vulnerable due to the fact that they must keep a port open on their firewall to enable a connection to a client. Hackers use this vulnerability to attack the server or computer with a Denial of Service (DoS) attack to deny use of the server.

There exist needs for improvement in network routing. One or more of these needs is addressed by one or more aspects of the present invention.

SUMMARY OF THE INVENTION

The present invention includes many aspects and features. Moreover, while many aspects and features relate to, and are described in, the context of network routing and network communications associated with the Internet, the present invention is not limited to use only in conjunction with the Internet and is applicable in other networked systems not associated with the Internet, as will become apparent from the following summaries and detailed descriptions of aspects, features, and one or more embodiments of the present invention.

A first aspect relates to a method for network communications from a first device to a second device that includes communicating data from the first device to the second device by spawning a first virtual machine for a first network connection that virtualizes network capabilities of the electronic device, and using the virtualized network capabilities of the first virtual machine, transmitting a plurality of packets for communication to a first network address and port combination associated with the second device. The method further includes repeatedly changing to a respective another network address and port combination by repeatedly spawning a respective another virtual machine for a respective another network connection that virtualizes network capabilities of the electronic device, and using the virtualized network capabilities of the spawned respective another virtual machine, transmitting a plurality of packets for communication to the respective another network address and port combination associated with the second device.

Another aspect relates to a method for network communications from a first device to a second device comprising communicating data from the first device to the second device by, spawning a first virtual machine for a first network connection that virtualizes network capabilities of the electronic device, and using the virtualized network capabilities of the first virtual machine, transmitting a plurality of packets for communication to a first network address and port combination associated with the second device; and repeatedly changing to a respective another network address and port combination by repeatedly spawning a respective another virtual machine for a respective another network connection that virtualizes network capabilities of the electronic device, and using the virtualized network capabilities of the spawned respective another virtual machine, transmitting a plurality of packets for communication to the respective another network address and port combination associated with the second device.

Another aspect relates to a method of providing network communications using virtualization comprising detecting, at a first device, a request for a network connection from an application running on the first device; spawning, at the first device, a first virtual machine that virtualizes network capabilities of the first device such that a first virtual network connection is provided to the application, the application running external to the first virtual machine; communicating data from the application in a plurality of packets to a first network address and port combination associated with a destination device, the method involving, for each packet, transmitting, from the first device using the first virtual network connection, the packet for communication to the first network address and port combination associated with the destination device, receiving, at a third virtual machine that runs on a second device and that virtualizes network capabilities of the second device such that a third virtual network connection is provided, the packet, transmitting, from the second device using the third virtual network connection, the packet for communication to the destination device, and receiving, at a fourth virtual machine associated with the first network address and port combination that runs on the destination device and that virtualizes network capabilities of the destination device, the packet; spawning, at the first device, a second virtual machine that virtualizes network capabilities of the first device such that a second virtual network connection is provided to the application, the application running external to the second virtual machine; communicating data from the application in a plurality of packets to a second network address and port combination associated with the destination device, the method involving, for each packet, transmitting, from the first device using the second virtual network connection, the packet for communication to the second network address and port combination associated with the destination device, receiving, at a fifth virtual machine that runs on a third device and that virtualizes network capabilities of the third device such that a fifth virtual network connection is provided, the packet, transmitting, from the second device using the fifth virtual network connection, the packet for communication to the destination device, and receiving, at a sixth virtual machine associated with the second network address and port combination that runs on the destination device and that virtualizes network capabilities of the destination device, the packet.

Another aspect relates to a method of providing network communications using virtualization comprising spawning, at a first device, a first virtual machine that virtualizes network capabilities of the first device such that a first virtual network connection is provided; communicating data from the first device in a plurality of packets to a first network address and port combination associated with a destination device, the method involving, for each packet, transmitting, from the first device using the first virtual network connection, the packet for communication to the first network address and port combination associated with the destination device, receiving, at a third virtual machine that runs on a second device and that virtualizes network capabilities of the second device such that a third virtual network connection is provided, the packet, transmitting, from the second device using the third virtual network connection, the packet for communication to the destination device, and receiving, at a fourth virtual machine associated with the first network address and port combination that runs on the destination device and that virtualizes network capabilities of the destination device, the packet; spawning, at the first device, a second virtual machine that virtualizes network capabilities of the first device such that a second virtual network connection is provided; communicating data in a plurality of packets to a second network address and port combination associated with the destination device, the method involving, for each packet, transmitting, from the first device using the second virtual network connection, the packet for communication to the second network address and port combination associated with the destination device, receiving, at a fifth virtual machine that runs on a third device and that virtualizes network capabilities of the third device such that a fifth virtual network connection is provided, the packet, transmitting, from the second device using the fifth virtual network connection, the packet for communication to the destination device, and receiving, at a sixth virtual machine associated with the second network address and port combination that runs on the destination device and that virtualizes network capabilities of the destination device, the packet.

Another aspect relates to a method of providing network communications using virtualization comprising spawning, at a first device, a first virtual machine that virtualizes network capabilities of the first device such that a first virtual network connection is provided; communicating data from the first device in a plurality of packets to a first network address and port combination associated with a destination device, the method involving, for each packet, transmitting, from the first device using the first virtual network connection, the packet for communication to the first network address and port combination associated with the destination device, receiving, at a third virtual machine that runs on a second device and that virtualizes network capabilities of the second device such that a third virtual network connection is provided, the packet, transmitting, from the second device using the third virtual network connection, the packet for communication to the destination device, and receiving, at a fourth virtual machine associated with the first network address and port combination that runs on the destination device and that virtualizes network capabilities of the destination device, the packet; thereafter, repeatedly spawning, at the first device, an additional respective virtual machine that virtualizes network capabilities of the first device such that another virtual network connection is provided, and communicating data in a plurality of packets to varying network address and port combinations associated with the destination device, the method involving, for each packet, transmitting, from the first device using the respective virtual network connection, the packet for communication to a respective one of the varying network address and port combinations associated with the destination device, receiving, at a virtual machine that runs on another device and that virtualizes network capabilities of the other device such that a virtual network connection is provided, the packet, and transmitting, from that device using that virtual network connection, the packet for communication to the destination device, and receiving, at a respective virtual machine associated with the respective one of the varying network address and port combinations associated with the destination device that runs on the destination device and that virtualizes network capabilities of the destination device, the packet.

Another aspect relates to method of communicating data using virtualization from a first device to a destination device via a deflect device, the method comprising detecting, at the first device, a request for a network connection from an application running on the first device; spawning, at the first device, a first virtual machine that virtualizes network capabilities of the first device such that a first virtual network connection is provided to the application, the application running external to the first virtual machine; selecting, at the first device, a first deflect device for the first virtual network connection from among a plurality of available deflect devices for communicating data using the first virtual network connection; communicating data from the application in a plurality of packets to the selected deflect device, the method involving, for each packet, transmitting, from the first device using the first virtual network connection, the packet for communication to the deflect device, receiving, at a third virtual machine that runs on a second device and that virtualizes network capabilities of the second device such that a third virtual network connection is provided, the packet, transmitting, from the second device using the third virtual network connection, the packet for communication to the deflect device, and receiving, at a fourth virtual machine that runs on the deflect device and that virtualizes network capabilities of the deflect device, the packet; and communicating data from the deflect device in a plurality of packets to the destination device, the method involving, for each packet, transmitting, from the deflect device using the fourth virtual network connection, the packet for communication to the destination device, receiving, at a fifth virtual machine that runs on a third device and that virtualizes network capabilities of the third device such that a fifth virtual network connection is provided, the packet, transmitting, from the third device using the fifth virtual network connection, the packet for communication to the destination device, and receiving, at a sixth virtual machine that runs on the destination device and that virtualizes network capabilities of the destination device, the packet.

Another aspect relates to a method of communicating data using virtualization from a first device to a destination device via a deflect device, the method comprising spawning, at the first device, a first virtual machine that virtualizes network capabilities of the first device such that a first virtual network connection is provided; selecting, at the first device, a first deflect device for the first virtual network connection from among a plurality of available deflect devices for communicating data using the first virtual network connection; communicating data from the first device in a plurality of packets to the selected deflect device, the method involving, for each packet, transmitting, from the first device using the first virtual network connection, the packet for communication to the deflect device, receiving, at a third virtual machine that runs on a second device and that virtualizes network capabilities of the second device such that a third virtual network connection is provided, the packet,
  transmitting, from the second device using the third virtual network connection, the packet for communication to the deflect device, and receiving, at a fourth virtual machine that runs on the deflect device and that virtualizes network capabilities of the deflect device, the packet; and communicating data from the deflect device in a plurality of packets to the destination device, the method involving, for each packet, transmitting, from the deflect device using the fourth virtual network connection, the packet for communication to the destination device, receiving, at a fifth virtual machine that runs on a third device and that virtualizes network capabilities of the third device such that a fifth virtual network connection is provided, the packet, transmitting, from the third device using the fifth virtual network connection, the packet for communication to the destination device, and receiving, at a sixth virtual machine that runs on the destination device and that virtualizes network capabilities of the destination device, the packet.

Another aspect relates to a method of providing network communications using virtualization comprising detecting, at a first device, a request for a network connection from an application running on the first device; spawning, at the first device, a first virtual machine that virtualizes network capabilities of the first device such that a first virtual network connection is provided to the application, the application running external to the first virtual machine; selecting, at the first device, a first deflect device for the first virtual network connection from among a plurality of available deflect devices for communicating data using the first virtual network connection; communicating data from the application in a plurality of packets to a destination device via the selected deflect device, the method involving, for each packet, transmitting, from the first device using the first virtual network connection, the packet for communication to the deflect device, receiving, at a third virtual machine that runs on a second device and that virtualizes network capabilities of the second device such that a third virtual network connection is provided, the packet, transmitting, from the second device using the third virtual network connection, the packet for communication to the deflect device, receiving, at a fourth virtual machine that runs on the deflect device and that virtualizes network capabilities of the deflect device, the packet, transmitting, from the deflect device using the fourth virtual network connection, the packet for communication to the destination device, receiving, at a fifth virtual machine that runs on a third device and that virtualizes network capabilities of the third device such that a fifth virtual network connection is provided, the packet, transmitting, from the third device using the fifth virtual network connection, the packet for communication to the destination device, and receiving, at a sixth virtual machine that runs on the destination device and that virtualizes network capabilities of the destination device, the packet.

Another aspect relates to a method of providing network communications using virtualization comprising spawning, at the first device, a first virtual machine that virtualizes network capabilities of the first device such that a first virtual network connection is provided; selecting, at the first device, a first deflect device for the first virtual network connection from among a plurality of available deflect devices for communicating data using the first virtual network connection; communicating data from the first device in a plurality of packets to a destination device via the selected deflect device, the method involving, for each packet, transmitting, from the first device using the first virtual network connection, the packet for communication to the deflect device, receiving, at a third virtual machine that runs on a second device and that virtualizes network capabilities of the second device such that a third virtual network connection is provided, the packet, transmitting, from the second device using the third virtual network connection, the packet for communication to the deflect device, receiving, at a fourth virtual machine that runs on the deflect device and that virtualizes network capabilities of the deflect device, the packet, transmitting, from the deflect device using the fourth virtual network connection, the packet for communication to the destination device, receiving, at a fifth virtual machine that runs on a third device and that virtualizes network capabilities of the third device such that a fifth virtual network connection is provided, the packet, transmitting, from the third device using the fifth virtual network connection, the packet for communication to the destination device, and receiving, at a sixth virtual machine that runs on the destination device and that virtualizes network capabilities of the destination device, the packet.

Another aspect relates to a method of communicating between a first end-user device and a second end-user device comprising the steps of communicating by the first end-user device, to a point of entry gateway, a request to engage in network communications with the second-end user device; communicating, by the point of entry gateway to a presence server behind a firewall, the request to engage in network communications, the presence server maintaining connection information for the first end-user device and the second end-user device; communicating, from the presence server to the first end-user device, connection information for enabling an open network connection between the first and second end-user devices; communicating data from the first end-user device to a second end-user device by, spawning, at the first end-user device, a first virtual machine that virtualizes network capabilities of the first end-user device such that a first virtual network connection is provided, selecting, at the first end-user device, a deflect device for the first virtual network connection from among a plurality of available deflect devices for communicating data using the first virtual network connection, said selection being based at least in part on the connection information received from the server, spawning, at the second end-user device, a second virtual machine that virtualizes network capabilities of the second end-user device such that a second virtual network connection is provided, spawning, at the deflect device, a third virtual machine that virtualizes network capabilities of the deflect device such that a third virtual network connection is provided, establishing a network connection between the first end-user device, via the first virtual network connection, and the second end-user device, via the second virtual network connection, over a network path using the connection information, the network path including the deflect device, and for each of a plurality of packets, transmitting the packet from the first end-user device using the first virtual network connection for communication via the network path, receiving, at the deflect device using the third virtual network connection, the packet, and communicating the packet onward along the network path, and receiving, at the second end-user device using the second virtual network connection, the packet.

Another aspect relates to a method of communicating between a first end-user device and a second end-user device comprising the steps of communicating by the first end-user device, to a point of entry gateway, a request to engage in network communications with the second-end user device; communicating, by the point of entry gateway to a presence server behind a firewall, the request to engage in network communications, the presence server maintaining connection information for the first end-user device and the second end-user device; communicating, from the presence server to the first end-user device, connection information for enabling an open network connection between the first and second end-user devices; communicating data from the first end-user device to a second end-user device by, spawning, at the first end-user device, a first virtual machine that virtualizes network capabilities of the first end-user device such that a first virtual network connection is provided, spawning, at the second end-user device, a second virtual machine that virtualizes network capabilities of the second end-user device such that a second virtual network connection is provided, establishing a network connection between the first end-user device, via the first virtual network connection, and the second end-user device, via the second virtual network connection, over a network path using the connection information, the network path including a third device, and for each of a plurality of packets, transmitting the packet from the first end-user device using the first virtual network connection for communication via the network path, receiving, at the third device using a third virtual network connection, the packet, and communicating the packet onward along the network path, and receiving, at the second end-user device using the second virtual network connection, the packet.

Another aspect relates to a method of communicating data using virtualization and multi-protocol dispersion from a first device to a destination device via a deflect device, the method comprising spawning, at the first device, a first virtual machine that virtualizes network capabilities of the first device such that a first virtual network connection is provided; selecting a first deflect device for the first virtual network connection from among a plurality of available deflect devices for communicating data using the first virtual network connection; selecting a first protocol for communications from the first device to the first deflect device from among a plurality of available protocols for communicating data; communicating data from the first device in a plurality of packets using the selected first protocol to the selected deflect device, the method involving, for each packet, transmitting, from the first device using the first virtual network connection, the packet for communication to the first deflect device, receiving, at a third virtual machine that runs on a second device and that virtualizes network capabilities of the second device such that a third virtual network connection is provided, the packet, transmitting, from the second device using the third virtual network connection, the packet for communication to the deflect device, and receiving, at a fourth virtual machine that runs on the deflect device and that virtualizes network capabilities of the deflect device, the packet; and selecting a second protocol for communications from the first deflect device to the destination device from among a plurality of available protocols for communicating data; communicating data from the deflect device in a plurality of packets using the selected second protocol to the destination device, the method involving, for each packet, transmitting, from the deflect device using the fourth virtual network connection, the packet for communication to the destination device, receiving, at a fifth virtual machine that runs on a third device and that virtualizes network capabilities of the third device such that a fifth virtual network connection is provided, the packet, transmitting, from the third device using the fifth virtual network connection, the packet for communication to the destination device, and receiving, at a sixth virtual machine that runs on the destination device and that virtualizes network capabilities of the destination device, the packet.

Another aspect relates to a method of communicating data using virtualization and multi-protocol dispersion from a first device to a destination device via a deflect device, the method comprising spawning, at the first device, a first virtual machine that virtualizes network capabilities of the first device such that a first virtual network connection is provided; selecting a first deflect device for the first virtual network connection from among a plurality of available deflect devices for communicating data using the first virtual network connection; selecting a first protocol for communications from the first device to the first deflect device from among a plurality of available protocols for communicating data; communicating data from the first device in a plurality of packets using the selected first protocol to the selected deflect device, the method involving, for each packet, transmitting, from the first device using the first virtual network connection, the packet for communication to the first deflect device, receiving, at a third virtual machine that runs on a second device and that virtualizes network capabilities of the second device such that a third virtual network connection is provided, the packet, transmitting, from the second device using the third virtual network connection, the packet for communication to the deflect device, and receiving, at a fourth virtual machine that runs on the deflect device and that virtualizes network capabilities of the deflect device, the packet; and selecting a second protocol for communications from the first deflect device to the destination device from among a plurality of available protocols for communicating data; reformatting, at the first deflect device, received data from the first protocol to the second protocol; communicating data from the deflect device in a plurality of packets using the selected second protocol to the destination device, the method involving, for each packet, transmitting, from the deflect device using the fourth virtual network connection, the packet for communication to the destination device, receiving, at a fifth virtual machine that runs on a third device and that virtualizes network capabilities of the third device such that a fifth virtual network connection is provided, the packet, transmitting, from the third device using the fifth virtual network connection, the packet for communication to the destination device, and receiving, at a sixth virtual machine that runs on the destination device and that virtualizes network capabilities of the destination device, the packet.

Another aspect relates to a method of communicating data using virtualization and superframes, the method comprising spawning, at a first device, a first virtual machine that virtualizes network capabilities of the first device such that a first virtual network connection is provided; selecting, at the first device, a first deflect device for the first virtual network connection from among a plurality of available deflect devices for communicating data using the first virtual network connection; constructing, at the first device, a superframe comprising a first frame containing a first data packet, a second frame containing a second data packet, and an indication that the first deflect device is to split the superframe, an indication of a first destination for the first data packet, an indication of a second destination for the second data packet; communicating the superframe from the first device to the selected deflect device by transmitting, from the first device using the first virtual network connection, the superframe for communication to the first deflect device, receiving, at a third virtual machine that runs on a second device and that virtualizes network capabilities of the second device such that a third virtual network connection is provided, the superframe, transmitting, from the second device using the third virtual network connection, the superframe for communication to the first deflect device, and receiving, at a fourth virtual machine that runs on the first deflect device and that virtualizes network capabilities of the first deflect device, the superframe; splitting, at the first deflect device, the superframe into the first data packet and the second data packet; determining, based on the indication of the first destination of the first data packet, the first destination of the first data packet; determining, based on the indication of the second destination of the second data packet, the second destination of the second data packet; communicating the first data packet from the deflect device to the first destination by transmitting, from the deflect device using a virtual network connection, the first data packet for communication to the first destination, receiving, at a fifth virtual machine that runs on a third device and that virtualizes network capabilities of the third device such that a fifth virtual network connection is provided, the first data packet, transmitting, from the third device using the fifth virtual network connection, the first data packet for communication to the first destination, and receiving, at a sixth virtual machine that runs on the first destination and that virtualizes network capabilities of the first destination, the first data packet; communicating the second data packet from the deflect device to the second destination by transmitting, from the deflect device using a virtual network connection, the second data packet for communication to the second destination, receiving, at a seventh virtual machine that runs on a fourth device and that virtualizes network capabilities of the fourth device such that a seventh virtual network connection is provided, the second data packet, transmitting, from the fourth device using the seventh virtual network connection, the second data packet for communication to the second destination, and receiving, at an eighth virtual machine that runs on the second destination and that virtualizes network capabilities of the second destination, the second data packet.

Another aspect relates to a method of communicating data using virtualization and superframes, the method comprising spawning, at a first device, a first virtual machine that virtualizes network capabilities of the first device such that a first virtual network connection is provided; selecting, at the first device, a first deflect device for the first virtual network connection from among a plurality of available deflect devices for communicating data using the first virtual network connection; constructing, at the first device, a superframe comprising a first frame containing a first data packet, a second frame containing a second data packet, and an indication that the first deflect device is to split the superframe, an indication of a first path for the first data packet, an indication of a second path for the second data packet; communicating the superframe from the first device to the selected deflect device by transmitting, from the first device using the first virtual network connection, the superframe for communication to the first deflect device, receiving, at a third virtual machine that runs on a second device and that virtualizes network capabilities of the second device such that a third virtual network connection is provided, the superframe, transmitting, from the second device using the third virtual network connection, the superframe for communication to the first deflect device, and receiving, at a fourth virtual machine that runs on the first deflect device and that virtualizes network capabilities of the first deflect device, the superframe; splitting, at the first deflect device, the superframe into the first data packet and the second data packet; determining, based on the indication of the first path for the first data packet, a first target device of the first data packet; determining, based on the indication of the second path for the second data packet, a second target device of the second data packet; communicating the first data packet from the deflect device to the first target device by transmitting, from the deflect device using a virtual network connection, the first data packet for communication to the first target device, receiving, at a fifth virtual machine that runs on a third device and that virtualizes network capabilities of the third device such that a fifth virtual network connection is provided, the first data packet, transmitting, from the third device using the fifth virtual network connection, the first data packet for communication to the first target device, and receiving, at a sixth virtual machine that runs on the first destination and that virtualizes network capabilities of the first destination, the first data packet; communicating the second data packet from the deflect device to the second target device by transmitting, from the deflect device using a virtual network connection, the second data packet for communication to the second target device, receiving, at a seventh virtual machine that runs on a fourth device and that virtualizes network capabilities of the fourth device such that a seventh virtual network connection is provided, the second data packet, transmitting, from the fourth device using the seventh virtual network connection, the second data packet for communication to the second target device, and receiving, at an eighth virtual machine that runs on the second target device and that virtualizes network capabilities of the second target device, the second data packet.

In a feature of this aspect, the first target device comprises a destination device.

In a feature of this aspect, the first target device comprises a deflect.

In a feature of this aspect, the first target device comprises a destination device and the second target device comprises a deflect.

In a feature of this aspect, the first and second target devices both comprise deflects.

Another aspect relates to a method of communicating data using virtualization and superframes, the method comprising spawning, at a first device, a first virtual machine that virtualizes network capabilities of the first device such that a first virtual network connection is provided; selecting, at the first device, a first deflect device for the first virtual network connection from among a plurality of available deflect devices for communicating data using the first virtual network connection; constructing, at the first device, a superframe comprising a first frame containing a first data packet, a second frame containing a second data packet, and an indication that the first deflect device is to split the superframe, an indication of a first target device for the first data packet, an indication of a second target device for the second data packet; communicating the superframe from the first device to the selected deflect device by transmitting, from the first device using the first virtual network connection, the superframe for communication to the first deflect device, receiving, at a third virtual machine that runs on a second device and that virtualizes network capabilities of the second device such that a third virtual network connection is provided, the superframe, transmitting, from the second device using the third virtual network connection, the superframe for communication to the first deflect device, and receiving, at a fourth virtual machine that runs on the first deflect device and that virtualizes network capabilities of the first deflect device, the superframe; splitting, at the first deflect device, the superframe into the first data packet and the second data packet; determining, based on the indication of the first target device for the first data packet, the first target device for the first data packet; determining, based on the indication of the second target device for the second data packet, the second target device for the second data packet; communicating the first data packet from the deflect device to the first target device by transmitting, from the deflect device using a virtual network connection, the first data packet for communication to the first target device, receiving, at a fifth virtual machine that runs on a third device and that virtualizes network capabilities of the third device such that a fifth virtual network connection is provided, the first data packet, transmitting, from the third device using the fifth virtual network connection, the first data packet for communication to the first target device, and receiving, at a sixth virtual machine that runs on the first destination and that virtualizes network capabilities of the first destination, the first data packet; communicating the second data packet from the deflect device to the second target device by transmitting, from the deflect device using a virtual network connection, the second data packet for communication to the second target device, receiving, at a seventh virtual machine that runs on a fourth device and that virtualizes network capabilities of the fourth device such that a seventh virtual network connection is provided, the second data packet, transmitting, from the fourth device using the seventh virtual network connection, the second data packet for communication to the second target device, and receiving, at an eighth virtual machine that runs on the second target device and that virtualizes network capabilities of the second target device, the second data packet.

Another aspect relates to a method of communicating data using virtualization and superframes, the method comprising spawning, at a first device, a first virtual machine that virtualizes network capabilities of the first device such that a first virtual network connection is provided; selecting, at the first device, a first deflect device for the first virtual network connection from among a plurality of available deflect devices for communicating data using the first virtual network connection; constructing, at the first device, a superframe comprising a plurality of data packets packaged together in two or more frames, an indication that the first deflect device is to split the superframe, and an indication of a target device for each frame of the superframe; communicating the superframe from the first device to the selected deflect device by transmitting, from the first device using the first virtual network connection, the superframe for communication to the first deflect device, receiving, at a third virtual machine that runs on a second device and that virtualizes network capabilities of the second device such that a third virtual network connection is provided, the superframe, transmitting, from the second device using the third virtual network connection, the superframe for communication to the first deflect device, and receiving, at a fourth virtual machine that runs on the first deflect device and that virtualizes network capabilities of the first deflect device, the superframe; splitting, at the first deflect device, the superframe into the constituent frames; determining, for each frame, based on the indication of a target device for that frame, a respective target device for that frame; communicating, for each respective frame, the data contained in that respective frame to the associated target device by transmitting, from the deflect device using a respective virtual network connection, the respective frame for communication to the respective associated target device, receiving, at another virtual machine that runs on another device and that virtualizes network capabilities of that device such that a virtual network connection is provided, the respective frame, and transmitting, from that device using that virtual network connection, the respective frame for communication to the respective associated target device, and receiving, at a virtual machine that runs on the respective target device and that virtualizes network capabilities of the respective target device, the respective frame.

Another aspect relates to a method of providing network communications using virtualization, comprising spawning, at a first device, a plurality of virtual machine instances that runs on the first device and that virtualizes network capabilities of the first device such that a plurality of virtual network connection links is provided; intercepting, at a session layer for a first device, a plurality of messages that originated on the first device, the messages each being associated with an application running on the first device; parsing out, at the session layer, the intercepted messages to the plurality of virtual network connections for communicating to an indicated destination device; communicating each intercepted message to a respective destination device using a respective one of the plurality of virtual network connections in a plurality of data packets by, for each packet, transmitting, from the first device using the respective virtual network connection, the packet for communication to the respective destination device, receiving, at another virtual machine that runs on another device and that virtualizes network capabilities of that device such that a virtual network connection is provided, the packet, and transmitting, from that device using that virtual network connection, the packet for communication to the respective destination device, and receiving, at a virtual machine that runs on the respective destination device and that virtualizes network capabilities of the respective destination device, the packet.

Another aspect relates to a method comprising determining, based on one or more packets communicated from a first end device to a second end device over a first network path, an average time it takes to communicate a packet from the first end device to the second end device over the first network path; determining, based on one or more packets communicated from a first end device to a second end device over a second network path, an average time it takes to communicate a packet from the first end device to the second end device over the second network path; determining that that the determined average time it takes to communicate a packet from the first end device to the second end device over the first network path is less than a minimum time threshold associated with a priority level of the first end device; determining that that the determined average time it takes to communicate a packet from the first end device to the second end device over the second network path is greater than a minimum time threshold associated with a priority level of the first end device; determining, based on the determination that the determined average time it takes to communicate a packet from the first end device to the second end device over the first network path is less than a minimum time threshold associated with a priority level of the first end device, that the first end user device does not have a high enough priority level to utilize the first network path; communicating, based on the determination that the first end user device does not have a high enough priority level to utilize the first network path, over the second network path.

Another aspect relates to a method of communicating data using virtualization from a first device to a destination device via two deflect devices, the method comprising spawning, at the first device, a first virtual machine that virtualizes network capabilities of the first device such that a first virtual network connection is provided; selecting a first deflect device for affecting a network path for communications from the first device to the destination device; selecting a second deflect device for affecting a network path for communications from the first device to the destination device; communicating data from the first device in a plurality of packets to the selected first deflect device, the method involving, for each packet, transmitting, from the first device using the first virtual network connection, the packet for communication to the first deflect device, receiving, at a third virtual machine that runs on a second device and that virtualizes network capabilities of the second device such that a third virtual network connection is provided, the packet, transmitting, from the second device using the third virtual network connection, the packet for communication to the first deflect device, and receiving, at a fourth virtual machine that runs on the first deflect device and that virtualizes network capabilities of the deflect device, the packet; communicating data from the first deflect device in a plurality of packets to the selected second deflect device, the method involving, for each packet, transmitting, from the first deflect device using the fourth virtual network connection, the packet for communication to the second deflect device, receiving, at a fifth virtual machine that runs on a third device and that virtualizes network capabilities of the third device such that a fifth virtual network connection is provided, the packet, transmitting, from the third device using the fifth virtual network connection, the packet for communication to the second deflect device, and receiving, at a sixth virtual machine that runs on the destination device and that virtualizes network capabilities of the second deflect device, the packet; and communicating data from the second deflect device in a plurality of packets to the destination device, the method involving, for each packet, transmitting, from the second deflect device using the sixth virtual network connection, the packet for communication to the destination device, receiving, at a seventh virtual machine that runs on a fourth device and that virtualizes network capabilities of the fourth device such that a seventh virtual network connection is provided, the packet, transmitting, from the fourth device using the seventh virtual network connection, the packet for communication to the destination device, and receiving, at an eighth virtual machine that runs on the destination device and that virtualizes network capabilities of the destination device, the packet.

Another aspect relates to a method comprising spawning, at the first device, a first virtual machine that virtualizes network capabilities of the first device such that a first virtual network connection is provided; selecting, at the first device, a first deflect device for the first virtual network connection, from among a plurality of available deflect devices, for communicating data using the first virtual network connection; attempting to establish a connection with a destination device utilizing the selected first deflect device and the first virtual network connection; spawning, at the first device, a second virtual machine that virtualizes network capabilities of the first device such that a second virtual network connection is provided; selecting, at the first device, a second deflect device for the second virtual network connection, from among a plurality of available deflect devices, for communicating data using the second virtual network connection; attempting to establish a connection with the destination device utilizing the selected second deflect device and the second virtual network connection; spawning, at the first device, a third virtual machine that virtualizes network capabilities of the first device such that a third virtual network connection is provided; selecting, at the first device, a third deflect device for the first virtual network connection, from among a plurality of available deflect devices, for communicating data using the third virtual network connection; and attempting to establish a connection with the destination device utilizing the selected third deflect device and the third virtual network connection.

In a feature of this aspect, the method further includes saving information regarding whether a successful connection was established for each attempt.

In at least some implementations, the method further includes determining that a network connection to the destination has failed, and determining, based on saved information, a connection to attempt.

In at least some implementations, the method further includes determining that a network connection to the destination has failed, and determining, based on saved information, a deflect to attempt to use.

Another aspect relates to a method comprising determining, utilizing GPS data, a speed and direction of a mobile electronic device; determining, based on the determination of a speed and direction of the mobile electronic device, an access point to utilize to communicate with the mobile electronic device.

Another aspect relates to a method comprising spawning, by a mobile device, a first virtual machine that virtualizes network capabilities of the mobile device such that a first virtual network connection is provided; establishing a connection, by the mobile device utilizing the first virtual network connection, with a first access point; spawning, by the mobile device, a second virtual machine that virtualizes network capabilities of the mobile device such that a second virtual network connection is provided; establishing a connection, by the mobile device utilizing the second virtual network connection, with a second access point.

Another aspect relates to a method comprising spawning, by a mobile device, a first virtual machine that virtualizes network capabilities of the mobile device such that a first virtual network connection is provided; establishing a connection, by the mobile device utilizing the first virtual network connection, with a first access point; maintaining, by the mobile device, connectivity by using spread spectrum protocol setups to roll connections and continue streaming data while moving from one access point to another.

Another aspect relates to a method comprising spawning, by a mobile device, a first virtual machine that virtualizes network capabilities of the mobile device such that a first virtual network connection is provided; forcing, by a mobile device, a connection to a particular access point by selecting, at the mobile device, a deflect device for the first virtual network connection, from among a plurality of available deflect devices, for communicating data using the first virtual network connection, and establishing a connection with the particular access point via the selected deflect device.

Another aspect relates to a method comprising determining that a mobile device may be connected to first and second access points; and attempting to communicate a message to the mobile device via both the first access point and the second access point.

Another aspect relates to a method comprising determining that a mobile device is likely to soon be in communication with a deflect; communicating a message intended for the mobile device to the deflect; storing the message at the deflect; and communicating, by the deflect upon contact with the mobile device, the stored message to the mobile device.

In addition to the disclosed aspects and features of the present invention, it should be noted that the present invention further encompasses the various possible combinations and subcombinations of such aspects and features. Thus, for example, any aspect may be combined with an aforementioned feature in accordance with the present invention without requiring any other aspect or feature.

BRIEF DESCRIPTION OF THE DRAWINGS

One or more preferred embodiments of the present invention now will be described in detail with reference to the accompanying drawings.

FIG. 6 includes Table 1, which table details data stored by a node in the payload of a packet.

FIG. 10 presents table 9, which illustrates potential resource reduction in accordance with one or more preferred implementations.

FIG. 29 illustrates VDN routing from a first virtual thin client to another virtual thin client using two deflects that are configured simply to pass data through.

DETAILED DESCRIPTION

Figure 1:
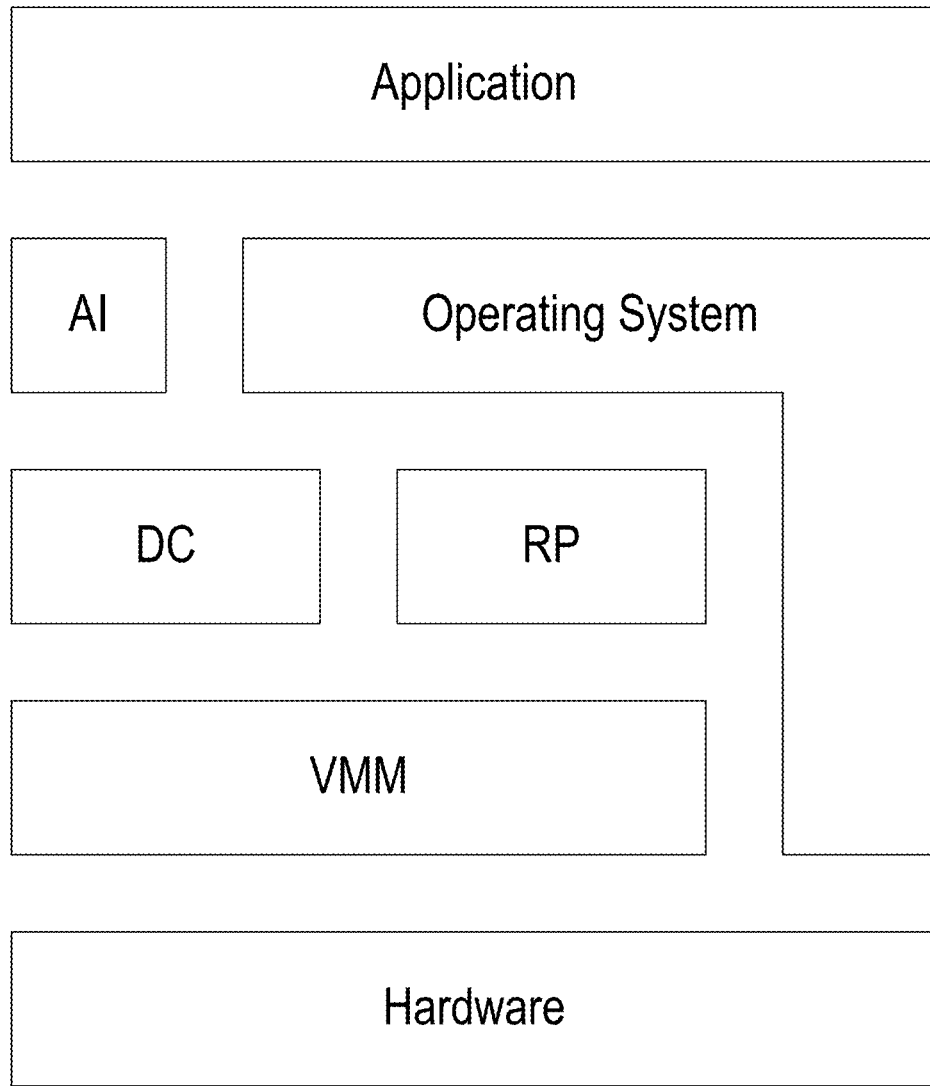
FIG. 1 illustrates components of a VDR software client loaded onto a client device in accordance with an embodiment of the present invention.

As a preliminary matter, it will readily be understood by one having ordinary skill in the relevant art ("Ordinary Artisan") that the present invention has broad utility and application. Furthermore, any embodiment discussed and identified as being "preferred" is considered to be part of a best mode contemplated for carrying out the present invention. Other embodiments also may be discussed for additional illustrative purposes in providing a full and enabling disclosure of the present invention. Moreover, many embodiments, such as adaptations, variations, modifications, and equivalent arrangements, will be implicitly disclosed by the embodiments described herein and fall within the scope of the present invention.

Accordingly, while the present invention is described herein in detail in relation to one or more embodiments, it is to be understood that this disclosure is illustrative and exemplary of the present invention, and is made merely for the purposes of providing a full and enabling disclosure of the present invention. The detailed disclosure herein of one or more embodiments is not intended, nor is to be construed, to limit the scope of patent protection afforded the present invention, which scope is to be defined by the claims and the equivalents thereof. It is not intended that the scope of patent protection afforded the present invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection afforded the present invention is to be defined by the appended claims rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

Furthermore, it is important to note that, as used herein, "a" and "an" each generally denotes "at least one," but does not exclude a plurality unless the contextual use dictates otherwise. Thus, reference to "a picnic basket having an apple" describes "a picnic basket having at least one apple" as well as "a picnic basket having apples." In contrast, reference to "a picnic basket having a single apple" describes "a picnic basket having only one apple."

When used herein to join a list of items, "or" denotes "at least one of the items," but does not exclude a plurality of items of the list. Thus, reference to "a picnic basket having cheese or crackers" describes "a picnic basket having cheese without crackers", "a picnic basket having crackers without cheese", and "a picnic basket having both cheese and crackers." Finally, when used herein to join a list of items, "and" denotes "all of the items of the list." Thus, reference to "a picnic basket having cheese and crackers" describes "a picnic basket having cheese, wherein the picnic basket further has crackers," as well as describes "a picnic basket having crackers, wherein the picnic basket further has cheese."

Further, as used herein, the term server may be utilized to refer to both a single server, or a plurality of servers working together.

Additionally, as used herein, "an open network connection" generally means a network pathway of router nodes that extends between two end-user devices whereby data is sent from one of the end-user devices to the other end-user device without connecting to a server, or an equivalent pathway where the data that is sent is neither stored nor forwarded by a server.

Referring now to the drawings, one or more preferred embodiments of the present invention are next described. The following description of one or more preferred embodiments is merely exemplary in nature and is in no way intended to limit the invention, its implementations, or uses.

VDR

Virtual dispersive routing (hereinafter, "VDR") relates generally to providing routing capabilities at a plurality of client devices using virtualization. Whereas traditional routing calls for most, if not all, routing functionality to be carried out by centrally located specialized routing devices, VDR enables dispersed client devices to assist with, or even takeover, routing functionality, and thus is properly characterized as dispersive. Advantageously, because routing is performed locally at a client device, a routing protocol is selected by the client based upon connection requirements of the local application initiating the connection. A protocol can be selected for multiple such connections and multiple routing protocols can even be utilized simultaneously. The fragile nature of the routing protocols will be appreciated, and thus virtualization is utilized together with the localization of routing to provide a much more robust system. Consequently, such dispersive routing is properly characterized as virtual.

More specifically, preferred VDR implementations require that a VDR software client be loaded on each client device to help control and optimize network communications and performance. Preferably, VDR is implemented exclusively as software and does not include any hardware components. Preferably, the basic components of a VDR software client include a routing platform (hereinafter, "RP"); a virtual machine monitor (hereinafter, "VMM"); a dispersive controller (hereinafter, "DC"); and an application interface (hereinafter, "AI"). FIG. 1 illustrates each of these components loaded onto a client device. Each of these components is now discussed in turn.

The Routing Platform (RP) and Multiple Routing Protocols

Despite eschewing the traditional routing model utilizing central points of control, VDR is designed to function with existing routing protocols. Supported routing protocols, together with software necessary for their use, are included in the routing platform component of the VDR software, which can be seen in FIG. 1. For example, the RP includes software to implement and support the Interior Gateway Routing Protocol ("IGRP"), the Enhanced Interior Gateway Routing Protocol ("EIGRP"), the Border Gateway Protocol ("BGP"), the Open Shortest Path First ("OSPF") protocol, and the Constrained Shortest Path First ("CSPF") protocol. It will be appreciated that in at least some embodiments, a port will be needed to allow conventional routing software to run on a chip core (for example, a core of an Intel chip) at a client device. Preferably, multi-core components are used to allow routing protocols to be run on multiple cores to improve overall performance.

Moreover, it will be appreciated that the ability to support multiple routing protocols allows VDR to meet the needs of applications having varying mobility requirements. Applications can be supported by ad hoc algorithms such as pro-active (table driven) routing, reactive (on-demand) routing, flow oriented routing, adaptive (situation aware) routing, hybrid (pro-active/reactive) routing, hierarchical routing, geographical routing, and power aware routing. Further, the use of multiple protocols supports broadcasting, multicasting, and simul-casting. It will be appreciated that the use of multiple protocols provides support for multi-threaded networking as well.

The Virtual Machine Monitor (VMM) and Virtualization

It will be appreciated that virtualization is known in some computing contexts, such as virtualization of memory and processing. Virtualization enables the abstraction of computer resources and can make a single physical resource appear, and function, as multiple logical resources. Traditionally, this capability enables developers to abstract development of an application so that it runs homogenously across many hardware platforms. More generally, virtualization is geared to hiding technical detail through encapsulation. This encapsulation provides the mechanism to support complex networking and improved security that is required to enable routing at client devices.

More specifically, a virtual machine (hereinafter, "VM") is a software copy of a real machine interface. The purpose of running a VM is to provide an environment that enables a computer to isolate and control access to its services. The virtual machine monitor (VMM) component is used to run a plurality of VMs on a real machine and interface directly with that real machine. As an example, consider a VMM on a real machine that creates and runs a plurality of VMs. A different operating system is then loaded onto each VM. Each VM provides a virtual interface that would appear to each operating system to be a real machine. The VMM runs the plurality of VMs and interfaces with the real machine.

In a VDR implementation, a VMM is utilized to create a VM for each distinct connection. It is helpful to explain at this juncture that what comprises a connection can vary, but in general includes a transfer of data in the form of packets from a first end device to a second end device along a path (or route). It will be appreciated that a single application can require multiple connections, for example, an application may require multiple connections because of bandwidth application requirements and performance requirements; in this event each connection preferably interfaces with its own VM and each connection can utilize (sometimes referred to as being tied to) the same routing protocol or different routing protocols, even though the connections are themselves necessitated by the same application. Similarly, although two connections may at times travel along an identical path, the connections themselves are nevertheless distinct, and each will preferably still continue to interface with its own VM.

The Dispersive Controller (DC) and Optimizing Performance

When the client is in need of a new connection, a dispersive controller located between an operating system and a driver that controls network hardware (such as a NIC card) intercepts the request for a new connection and tells the VMM to spawn a new VM associated with the desired connection. The DC then queries the application interface and utilizes any information obtained to select a routing protocol from among those supported by the RP. This selected routing protocol, however, is currently believed to be generally useless without knowledge of the surrounding network. To this end, the DC allows each client to find other clients, interrogate network devices, and utilize system resources. Thus, each VDR client is "network aware", in that routing information is gathered and maintained at each client by the DC.

Figure 2:
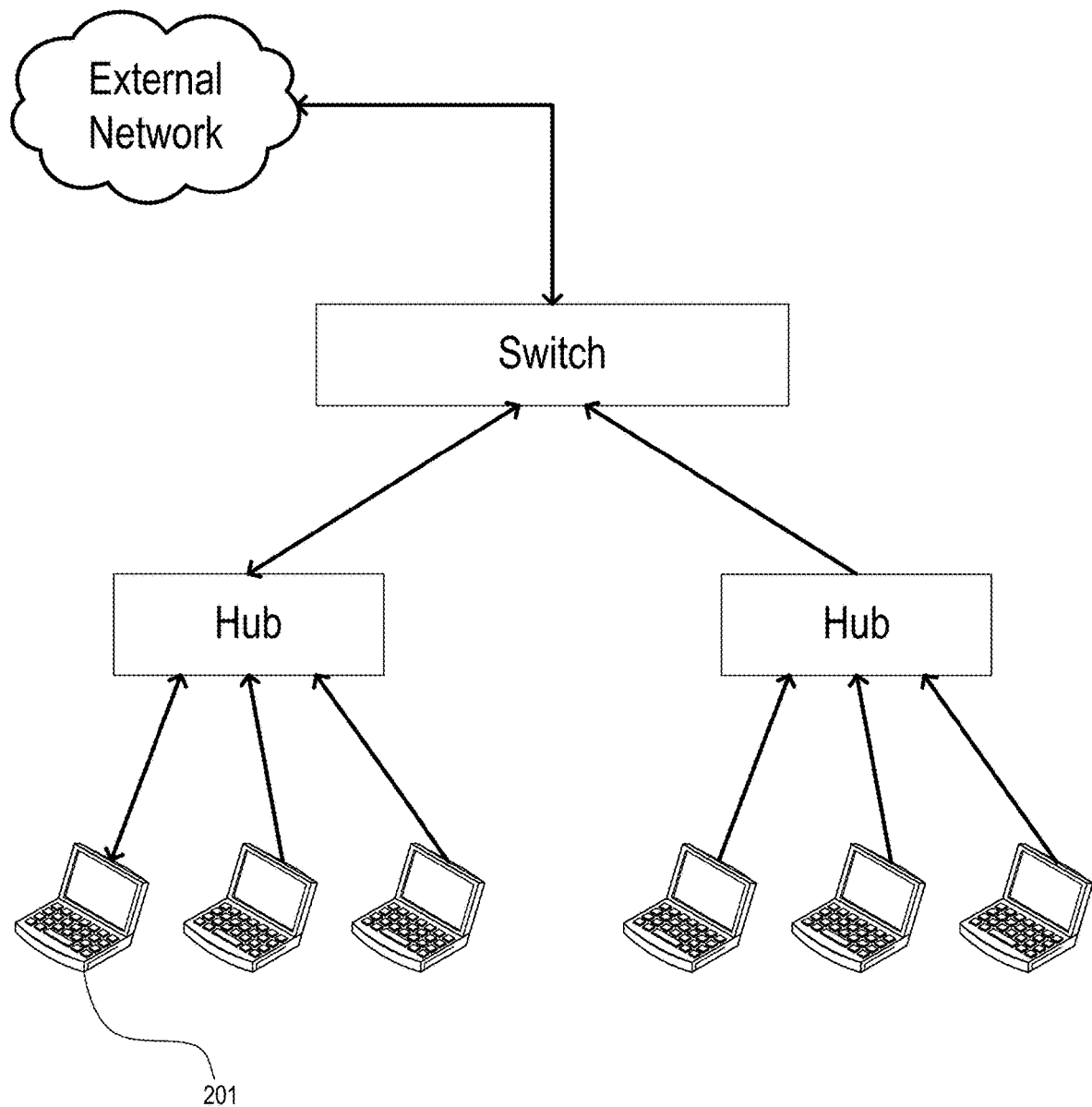
FIG. 2 illustrates how a VDR client gathers LAN routing information and queries an external network for backbone information and application-specific routing information in accordance with an embodiment of the present invention.

FIG. 2 illustrates how a VDR client 201 gathers LAN routing information and queries an external network for backbone information and application-specific routing information. In response to these queries, routing information is returned. This returned routing information is cached, processed, data mined, compared to historical data, and used to calculate performance metrics to gauge and determine the overall effectiveness of the network. This is possible because the resources available at a VDR client will typically be greater than those available at a conventional router.

In at least some embodiments, a VDR network functions in some ways similarly to a conventional network. In a conventional network, data, in the form of packets, is sent to a router to be routed according to a routing table maintained at the router. Similarly, in a VDR network, after utilizing gathered network information to generate a routing table, a client device utilizes this generated routing table to select a route and transmit a packet accordingly, which packet is then received by another client device and routed according to that client's routing table, and so on, until the packet reaches its destination.

However, rather than simply passing on received packets from client to client, in a manner akin to a traditional router, VDR, via the DC, instead takes advantage of the storage and processing resources available at each client, while still remaining compatible with existing network architecture, by attaching lower level protocol data to the payload of transmitted packets for subsequent client analysis.

Figure 3:
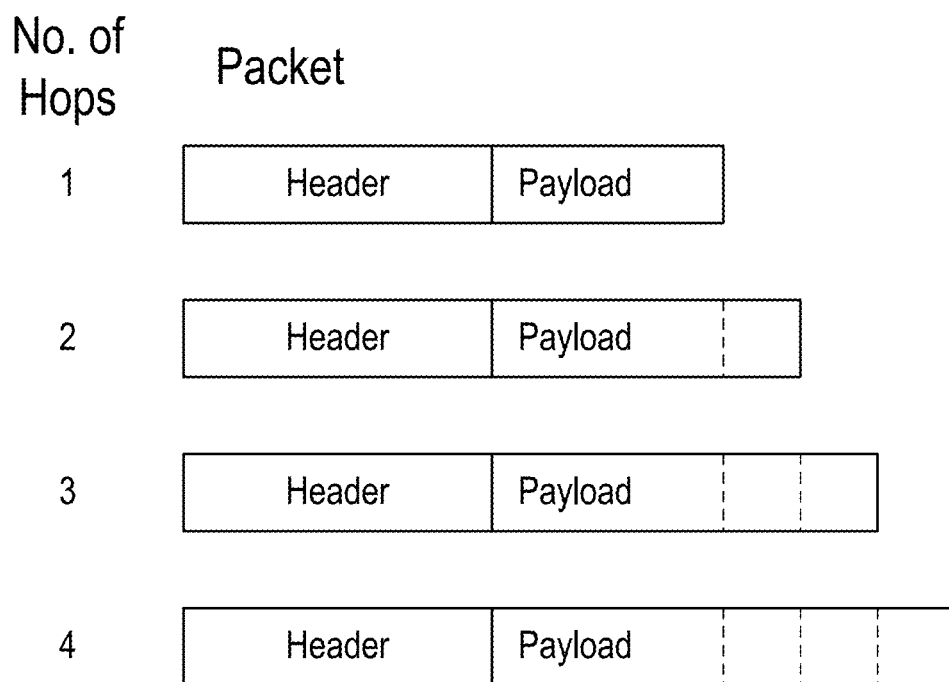
FIG. 3 illustrates how data is added to the payload of a packet on each of a plurality of hops in accordance with an embodiment of the present invention.

More specifically, when a packet is received at a VDR client, a virtual machine intercepts the packet passed from the networking hardware (for example, a NIC card) and places it in memory. The VDR client then processes the packet data. When the data is subsequently passed on, this processed data is appended to the payload of the packet together with information relating to the VDR client for analysis at the destination. As can be seen in FIG. 3, the result of this process is that each hop causes additional information to be added to the payload of a packet, and thus results in a direct increase in payload size proportionate to the number of hops taken by the packet. Specifically, each hop is believed to result in an increase of 35 bytes for an IPv4 implementation, and 59 bytes for an IPv6 implementation. Table 1 of FIG. 6 details the information stored from each layer, along with the number of bytes allotted for each field. It will be appreciated that different or additional information could be stored in alternative embodiments.

Currently, 128-bit addressing provides support for IPv4 and IPv6 addressing, but support for additional addressing schemes is contemplated. It will be appreciated that for a typical communication over the Internet, i.e., one consisting of around 20 hops, the overhead appended to the payload will be around 700 bytes utilizing IPv4 and around 1180 bytes utilizing IPv6. It is believed that, in a worst case scenario, an extra IP datagram could be required for every datagram sent. Although some of this data may seem redundant at first blush, some repetition is tolerable and even necessary because network address translation ("NAT") can change source or destination fields. That being said, it is contemplated that some implementations use caching to lower this overhead. Additionally, in at least some implementations, the VDR client utilizes application specific knowledge to tailor the information that is appended to the needs of a specific application.

Conventionally, when a packet is received at a router, routing information is typically stripped off each packet by the router and disregarded. This is because each router has limited memory and handles an enormous number of packets. When a packet is received at a destination VDR client, however, the destination client has sufficient resources to store and process the information delivered to it. Additionally, to the extent that client resources may be taxed, the VDR client need not always store this information in every packet received, as in at least some embodiments application knowledge provides the client with an understanding of which packets are important to applications running on the client. Regardless of whether some or all of this information delivered in the payload of each data packet is processed, the information that is processed is analyzed to create a "network fingerprint" of the nodes involved in the communication link. Thus, VDR software loaded on nodes along a path enables the nodes to append information regarding a path of a packet, which in turn enables the generation of a network fingerprint at the destination device, which network fingerprint represents a historical record that is stored and maintained for later forensic analysis. In addition to forensic analysis by the client, the maintenance of network information on the client enables forensic analysis by a server as well.

The Application Interface (AI) & Application Knowledge

One of the benefits of providing routing functionality at a client device is that the client is able to utilize its knowledge of the application initiating a connection to enhance routing performance for that application. This knowledge is provided to the DC via an application interface, as can be seen in FIG. 1. Utilizing application knowledge to enhance routing performance could be useful to a variety of applications, such, as for example, computer games including massively multiplayer online role playing games.

The virtualization of routing functionality at a client device, as described hereinabove, allows multiple routing protocols and algorithms to be run simultaneously on a client device. Thus, the DC utilizes the application interface to obtain required criteria for an application connection and then chooses from among the protocols and algorithms available via the RP.

For example, Application "A" may need to communicate very large amounts of data, and thus require a routing protocol that optimizes bandwidth, while Application "B" may only need to communicate very small amounts of data at very fast speeds, and thus require a routing protocol that minimizes latency irrespective of bandwidth. A traditional router cannot tell the difference between packets originating from Application "A" and those originating from Application "B", and thus will utilize the same routing protocol for packets from each application. A VDR client, however, is aware of applications running locally, and thus can be aware, through the AI, of various connection criteria for each application. These connection criteria can then be utilized by the VDR client in selecting a routing protocol or algorithm. Furthermore, as described hereinabove, both the selected routing protocol and the originating application associated with a packet can be communicated to other client nodes via data appended to the payload of the packet. Thus, the protocol selected at a source client can be utilized to route the packet throughout its path to a destination client. Further, because virtualization allows multiple routing protocols to be run on a single client, each application can utilize its own routing protocol.

Moreover, a VDR client can utilize knowledge of the path of a specific connection to further optimize performance. Because a network fingerprint can be gathered detailing the nodes in a communication path, a VDR client running on a client device can analyze each network fingerprint to determine whether the associated connection satisfies the connection criteria of the application desiring to utilize the connection. If the connection does not satisfy the connection criteria, then the client can attempt to find a connection that does satisfy the criteria by switching to a different protocol and/or switching to a different first node in its routing table. Combinations utilizing various protocols and selecting a variety of first nodes can be attempted, and the resultant paths evaluated until a path is found that does satisfy connection criteria. Additionally, combinations utilizing various protocols and selecting a variety of first nodes can be utilized to create route redundancy. Such route redundancy can provide to an application both higher bandwidth and controllable quality of service.

Although connection criteria for source and destination clients will often be identical, there are many situations where this will not be the case. For example, if one client is downloading streaming video from another client, then the connection requirements for each client will likely not be identical. In this and other situations, connections between two clients may be asymmetrical, i.e., client "A" transmits packets to client "B" over path 1, but client "B" transmits packets to client "A" over path 2. In each case, because path information gleaned from the payload of packets is stored and processed at the destination client, the evaluation of whether the path meets the required connection criteria is made at the destination client. In the example above, client "B" would determine whether path 1 satisfies its application's connection criteria, while client "A" would determine whether path 2 satisfies its application's connection criteria.

Perhaps the epitome of a connection that does not satisfy connection criteria is a broken, or failed, connection. In the event of a connection break, VDR enjoys a significant advantage over more traditional routing. Conventionally, recognition of a connection break would require a timeout at an upper level application, with either the path being rerouted subsequent to the timeout or a connection failure message being presented to a user. A VDR client, however, is aware of generally how long it should take to receive a response to a transmitted communication, and can utilize this awareness to speed up route convergence for additional network connections to insure application robustness and performance requirements, performance requirements being defined as criteria that must be met to allow the application to run properly, i.e., video conferencing can't wait too long for packets to show up or else the audio "crackles" and the image "freezes." For example, a VDR client may be aware that it should receive a response to a communication in 500 ms. If a response has not been received after 500 ms, the VDR client can initiate a new connection utilizing a different routing protocol and/or first node as outlined above with respect to finding a satisfactory connection path.

In addition to performance optimization, application knowledge can also be utilized to enhance network security. For example, an application may have certain security requirements. A VDR client aware of these requirements can create a "trusted network" connection that can be used to transfer information securely over this connection in accordance with the requirements of the application. A more traditional routing scheme could not ensure such a trusted connection, as it could not differentiate between packets needing this secure connection and other packets to be routed in a conventional manner.

But before elaborating on security measures that may be built in to a VDR implementation, it is worth noting that a VDR client is able to work in concert with an existing client firewall to protect software and hardware resources. It will be appreciated that conventional firewalls protect the flow of data into and out of a client and defend against hacking and data corruption. Preferably, VDR software interfaces with any existing client firewall for ease of integration with existing systems, but it is contemplated that in some implementations VDR software can include its own firewall. In either implementation, the VDR software can interface with the firewall to open and close ports as necessary, thereby controlling the flow of data in and out.

In addition to this firewall security, by utilizing application knowledge the VDR software can filter and control packets relative to applications running on the client. Thus, packets are checked not only to ensure a correct destination address, but further are checked to ensure that they belong to a valid client application.

One way VDR software can accomplish this is by utilizing "spiders" to thread together different layers of the protocol stack to enable data communication, thereby reducing delays and taking advantage of network topologies. Each spider represents software that is used to analyze data from different layers of the software stack and make decisions. These threaded connections can be used to speed data transfer in static configurations and modify data transfer in dynamic circumstances. As an example, consider a client device running a secure email application which includes a security identification code. Packets for this application include a checksum that when run will come up with this identification code. A spider would allow this upper level application security identification code to be connected to the lower layer. Thus, the lower layer could run a checksum on incoming packets and discard those that do not produce the identification code. It will be appreciated that a more complex MD5 hash algorithm could be utilized as well.

Moreover, because the VDR software is knowledgeable of the application requiring a particular connection, the software can adaptively learn and identify atypical behavior from an outside network and react by quarantining an incoming data stream until it can be verified. This ability to match incoming data against application needs and isolate any potential security issues significantly undermines the ability of a hacker to gain access to client resources.

Additionally, when such a security issue is identified, a VDR client can take appropriate steps to ensure that it does not compromise the network. Because a VDR client is network aware and keeps track of other clients that it has been communicating with, when a security issue is identified, the VDR client can not only isolate the suspect connection, the VDR client can further initiate a new connection utilizing a different routing protocol and/or first node as outlined above with respect to finding a satisfactory connection path. Alternatively, or additionally, the VDR client could simply choose to switch protocols on the fly and communicate this switch to each client with which it is in communication.

Figure 4A:
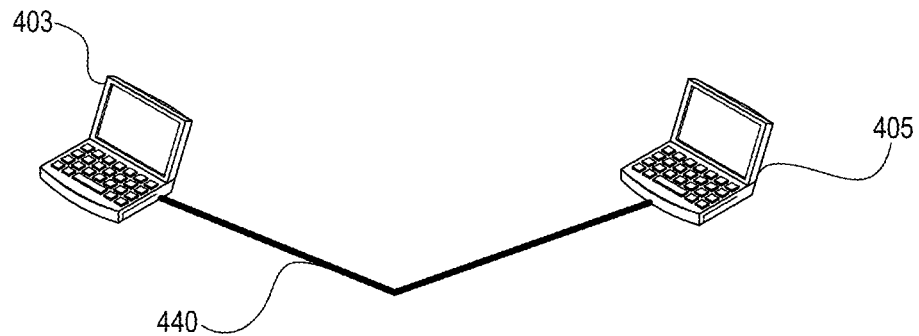
FIGS. 4A-C provide a simplified example of a VDR software response to a network attack in accordance with an embodiment of the present invention.
Figure 4B:
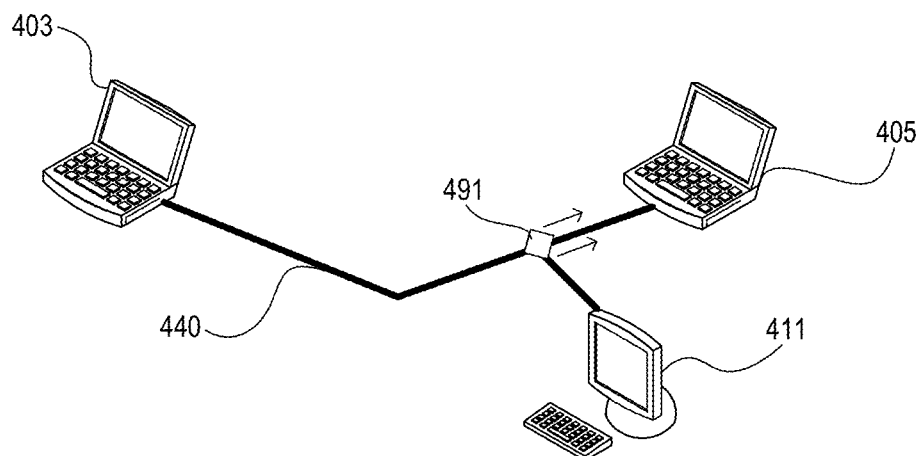
Figure 4C:
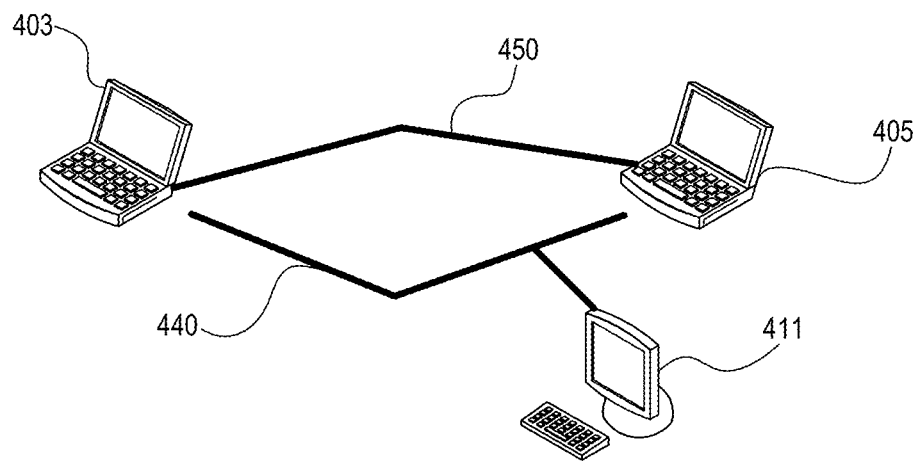

FIGS. 4A-C provide a simplified example of such action for illustrative effect. In FIG. 4A, VDR client 403 is communicating with VDR client 405 over connection 440. In FIG. 4B, external computer 411 tries to alter packet 491 transmitted from client 403 to client 405. Client 405 runs a hashing algorithm on the received packet 491 and identifies that it has been corrupted. Client 405 then quarantines packets received via connection 440 and, as can be seen in FIG. 4C, establishes a new connection 450 with client 403.

Upon discovery of an "attack" on a network or specific network connection, a VDR client can monitor the attack, defend against the attack, and/or attack the "hacker". Almost certainly, a new, secure connection will be established as described above. However, after establishing a new connection, the VDR client can then choose to simply kill the old connection, or, alternatively, leave the old connection up so that the attacker will continue to think the attack has some chance of success. Because each connection is virtualized, as described hereinabove, a successful attack on any single connection will not spill over and compromise the client as a whole, as crashing the VM associated with a single connection would not affect other VMs or the client device itself. It is contemplated that a VDR client will attempt to trace back the attack and attack the original attacker, or alternatively, and preferably, communicate its situation to another VDR client configured to do so.

An Exemplary Implementation

Traditionally, wired and wireless networks have tended to be separate and distinct. Recently, however, these types of networks have begun to merge, with the result being that the routing of data around networks has become much more complex. Further, users utilizing such a merged network desire a high level of performance from the network regardless of whether they are connected wirelessly or are connected via a fixed line. As discussed hereinabove, VDR enables a client to monitor routing information and choose an appropriate routing protocol to achieve the desired performance while still remaining compatible with existing network architecture. VDR can be implemented with wired networks, wireless networks (including, for example, Wi-Fi), and networks having both wired and wireless portions.

Figure 5A:
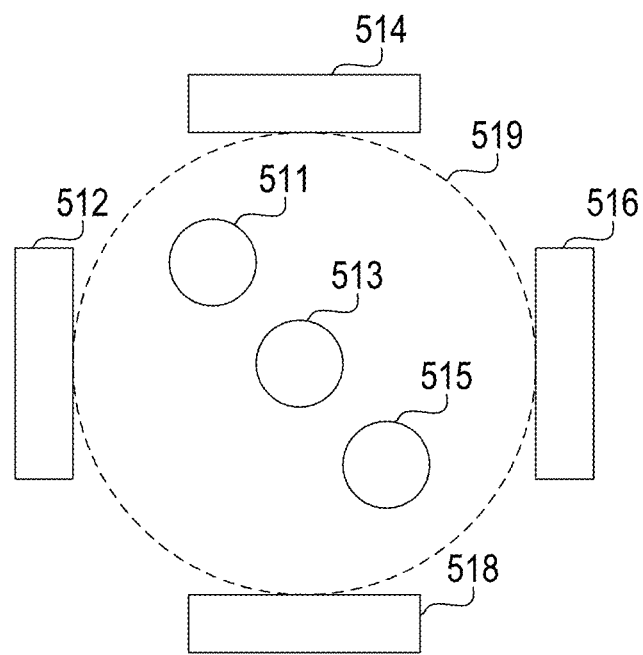
FIGS. 5A-C illustrate an exemplary VDR implementation in accordance with a preferred embodiment of the present invention.

FIG. 5A illustrates an exemplary local area network 510 (hereinafter, "LAN") utilizing VDR. The LAN 510 includes three internal nodes 511,513,515, each having VDR software loaded onto a client of the respective node. The internal nodes 511,513,515 can communicate with one another, and further can communicate with edge nodes 512,514,516,518, each also having VDR software loaded onto a client of the respective node. The coverage area 519 of the LAN 510 is represented by a dotted circle. It will be appreciated that the edge nodes 512,514,516,518 are located at the periphery of the coverage area 519. The primary distinction between the internal nodes 511,513,515 and the edge nodes 512,514,516,518 is that the internal nodes 511,513,515 are adapted only to communicate over the LAN 510, while the edge nodes 512,514,516,518 are adapted to communicate both with the internal nodes 511,513,515 and with edge nodes of other LANs through one or more wide area networks (hereinafter, "WANs"). As one of the nodes 511,513,515 moves within the LAN 510 (or, if properly adapted, moves to another LAN or WAN), VDR allows it to shift to ad hoc, interior, and exterior protocols. This ability to shift protocols allows the node to select a protocol which will provide the best performance for a specific application.

Figure 5B:
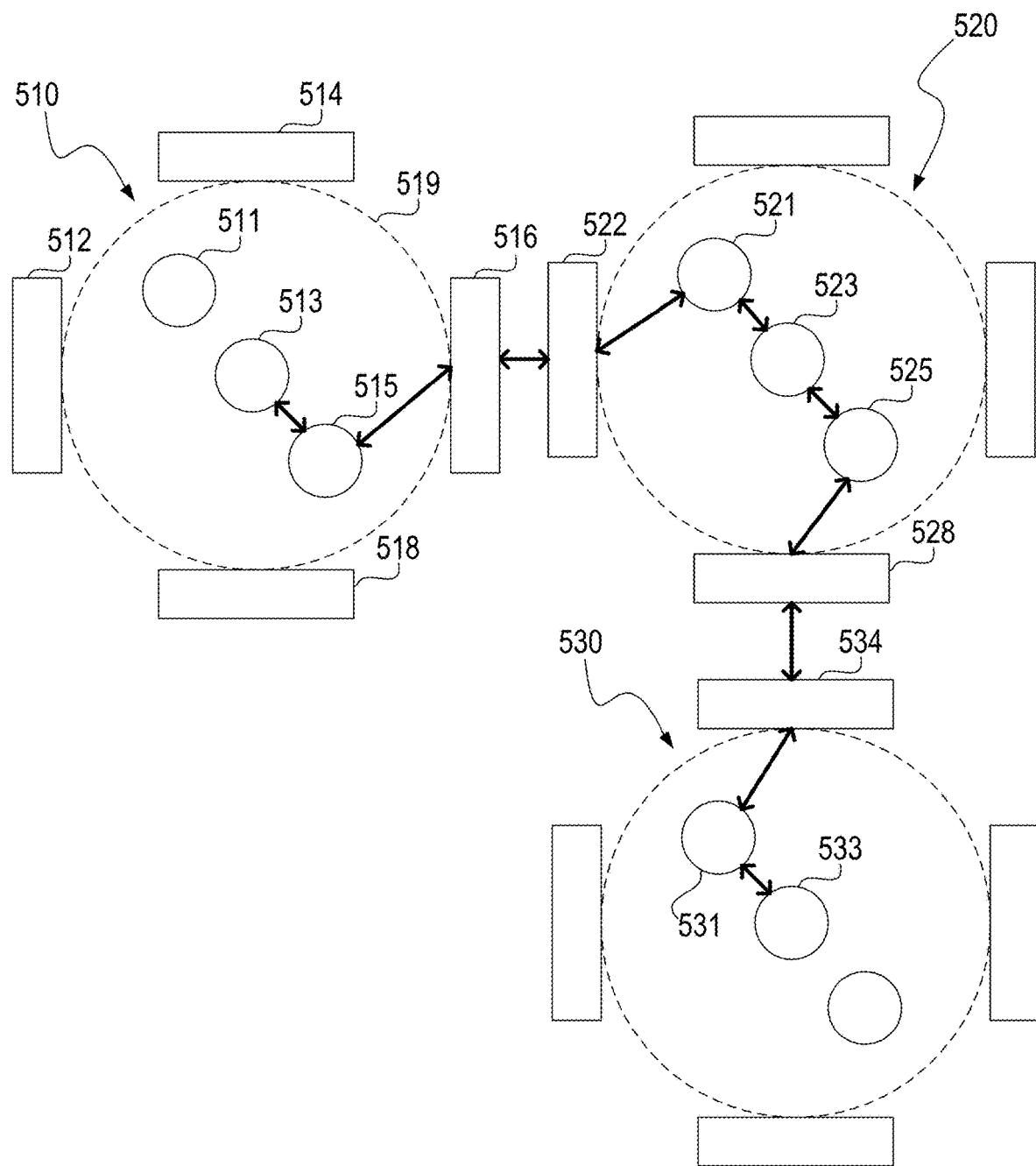

FIG. 5B illustrates an exemplary path between node 513 in LAN 510 and node 533 in LAN 530. It will be appreciated that an "interior" protocol is utilized for communications inside each LAN, and an "exterior" protocol is utilized for communications between edge nodes of different LANs. Thus, it will likewise be appreciated that each edge node must utilize multiple protocols, an interior protocol to communicate with interior nodes, and an exterior protocol to communicate with other edge nodes of different LANs. Further, at any time an ad hoc protocol could be set up which is neither a standard interior nor exterior protocol.

In FIG. 5B, LAN 510 and LAN 530 are both using CSPF as an interior protocol, while LAN 520 and LAN 540 are utilizing EIGRP as an interior protocol. All edge nodes of each of the LANs 510,520,530 are connected to a WAN utilizing BGP to communicate between edge nodes.

The exemplary path between node 513 and node 533 includes node 515, edge node 518, edge node 522, node 521, node 523, node 525, edge node 528, edge node 534, and node 531. Further, because a particular protocol was not selected and propagated by the transmitting node, this connection utilizes CSPF for internal communications within LAN 510 and LAN 530, EIGRP for internal communications within LAN 520, and BGP for external communications between edge nodes. At one or both end nodes, the VDR software can analyze this information and determine whether the combination of protocols along this path is satisfactory for the communicating application. It will be appreciated that the VDR software can further analyze the information gathered and determine whether the path meets application requirements for throughput, timing, security, and other important criteria.

In a static environment, this path may represent a connection that meets application requirements and thus no further adjustment would be needed. However, if a network outage were to occur, a network or a node were to move, or another dynamic event was to occur, the path could need to be altered.

Figure 5C:
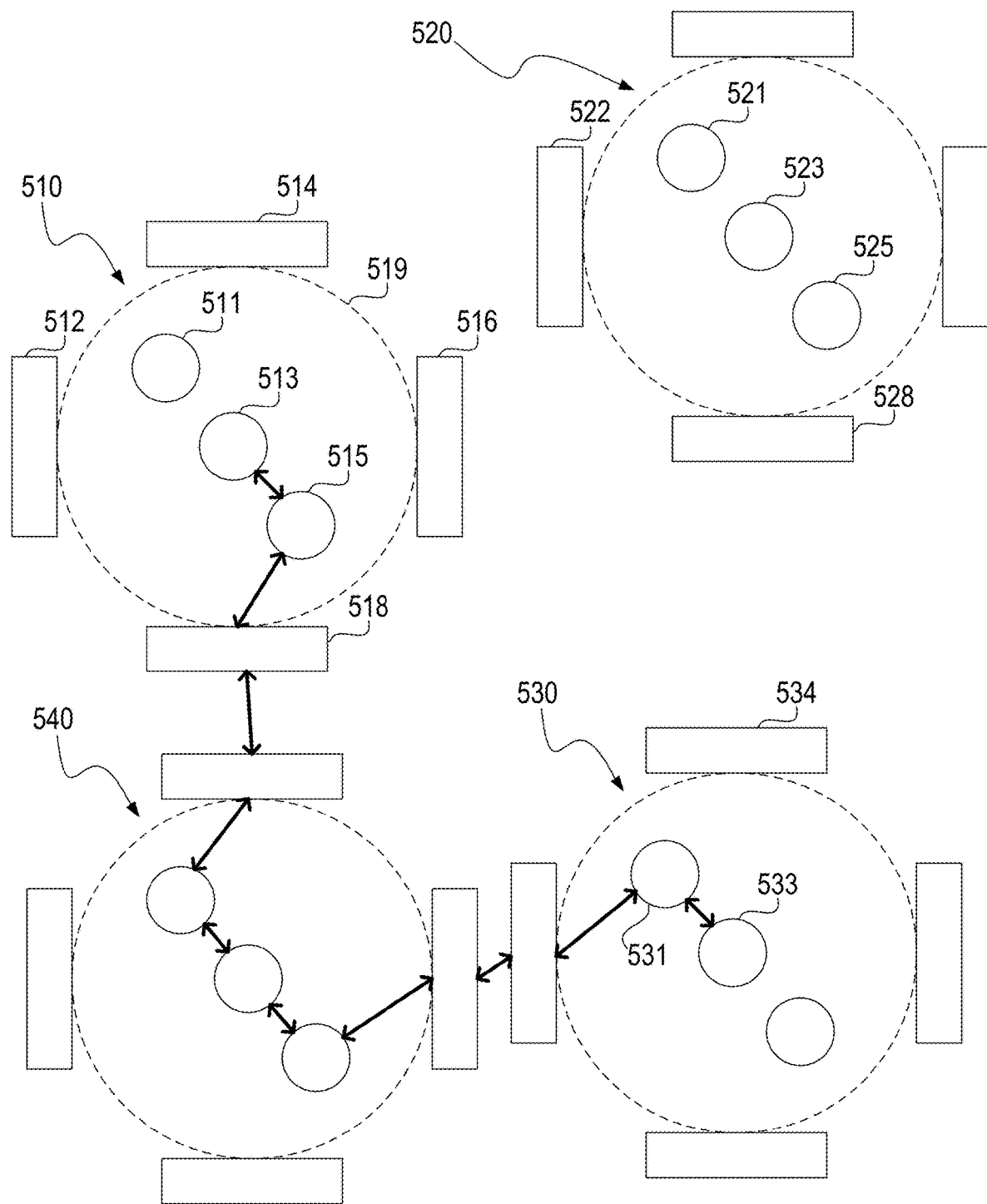

For example, if LAN 520 were to move out of range, node 533 might analyze the path information appended to a packet received after the movement and determine that increased latency resulting from this movement rendered this path unsuitable per application requirements. Node 533 would then attempt to establish a new connection utilizing a different route that would satisfy application requirements. FIG. 5C illustrates such a new connection, which remains between node 513 and node 533, but rather than being routed through LAN 520 as with the path illustrated in FIG. 5B, the path is instead routed through LAN 540.

It will be appreciated that the ability to influence path selection based on client application needs significantly enhances the performance, flexibility, and security of the network.

It will further be appreciated from the above description that one or more aspects of the present invention are contemplated for use with end, client, or end-client devices. A personal or laptop computer are examples of such a device, but a mobile communications device, such as a mobile phone, or a video game console are also examples of such a device. Still further, it will be appreciated that one or more aspects of the present invention are contemplated for use with financial transactions, as the increased security that can be provided by VDR is advantageous to these transactions.

Network Data Transfer

It will be appreciated that the transmission of data over the Internet, or one or more similar networks, often utilizes precious server processing, memory, and bandwidth, as the data is often delivered from, or processed at, a server. In implementations in accordance with one or more preferred embodiments of the present invention, some of this server load is mitigated by use of a direct connection between two end-user devices, such as, for example two end-user devices having virtualized routing capabilities as described hereinabove. Preferably, packets are then routed between the two end-user devices without passing through a conventional server.

Figure 7:
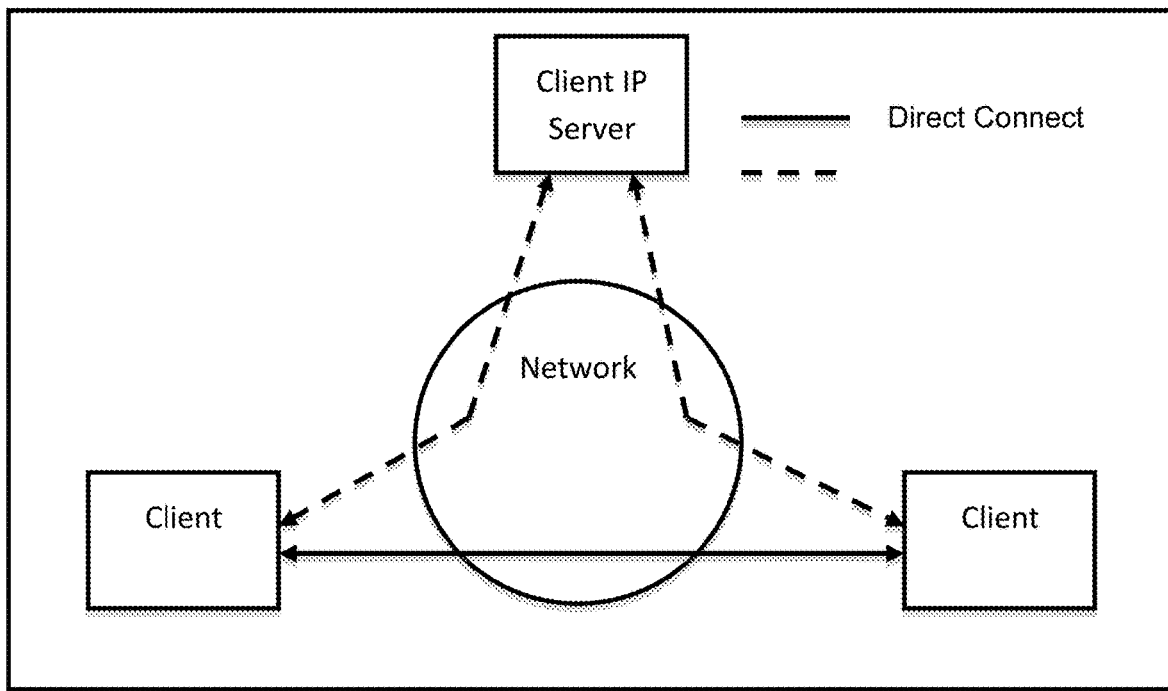
FIG. 7 illustrates a direct connection between two clients in accordance with one or more preferred implementations.

Notably, however, although transferred data packets do not pass through a server, a server may still be utilized to establish, monitor, and control a connection, as illustrated in FIG. 7. Specifically, FIG. 7 illustrates two clients and an IP server which determines that the clients are authorized to communicate with one another, and which passes connection information to the clients that is utilized to establish a direct connection between the clients. Importantly, the IP server is not involved in this direct connection, i.e. data transferred via this direct connection is not routed through or processed by the IP server, which would require the use of additional resources of the IP server.

It will be appreciated that, in some networks, a firewall may be setup to prevent an end-user device from accepting connections from incoming requests. There are three basic scenarios that can occur. In a first case, there is no firewall obstruction. In the first case, either client can initiate the connection for the direct connect. In a second case, a single client has a firewall obstructing the connection. In this case, the client that is obstructed from accepting the connection is instructed by the IP Server to initiate the connection to the client that is unobstructed by the firewall. In a third case, both clients have firewalls obstructing the connection. In this case, a software router, or software switch, is used to accept the connection of the two clients and pass the packets through to the clients directly. Notably, this software router truly acts as a switch, and does not modify the payload as it passes the packet through. In a preferred implementation, a software router is implemented utilizing field programmable gate arrays (FPGAs) or other specific hardware designed to implement such cross-connect functionality.

A preferred system for such a described direct connection includes one or more end-user devices having client software loaded thereon, an IP server, or control server, having server software loaded thereon, and one or more networks (such as, for example Internet, Intranet or Extranet supported by Ethernet, Mobile Phone data networks, e.g. CDMA, WiMAX, GSM, WCDMA and others, wireless networks, e.g. Bluetooth, WiFi, and other wireless data networks) for communication.

In a preferred implementation, client software installed at an end-user device is configured to communicate with an IP server, which associates, for example in a database, the IP address of the end-user device with a unique identification of a user, such as an email address, telephone number, or other unique identification. The client then periodically "checks in" with the IP server and conveys its IP address to the server, for example by providing its IP address together with the unique identification of the user. This checking in occurs when the client is "turned on", e.g. when the end-user device is turned on or when the client software is loaded, as well as when the IP address has changed, or upon the occurrence of any other network event that would change the path between the client and server, or in accordance with other configured or determined events, times, or timelines, which may be user-configurable.

By collecting, and updating, the current IP address of a user, other users may communicate with that user as the user moves from place to place. The IP server thus acts as a registry providing updated IP addresses associated with users. This capability also enables multiple device delivery of content to multiple end-user devices a user designates or owns.

Preferably, such functionality is utilized in combination with virtualized routing capability as described hereinabove. Specifically, it will be appreciated that, currently, Internet communications utilize sessions, and that upon being dropped, e.g. due to a lost connection, a new session must be initialized.

In a preferred implementation, however, rather than having to re-initiate a new session, for example upon obtaining a new IP address, a new session is created and data is transferred from the old session to the new session while maintaining the state of the old session. In this way, a near-seamless transition is presented to a user between an old session and a new session. For example, a user might be connected via their mobile device to a Wi-Fi connection while they are on the move. They might move out of range of the Wi-Fi connection, but still be in range of a cellular connection. Rather than simply dropping their session, a new session is preferably created, and data from the old session copied over, together with the state of the old session. In this way, although the end-user device is now connected via a cellular connection, rather than via a Wi-Fi connection, the user's experience was not interrupted.

One Client to One Client—File Transfer Implementation

In a preferred implementation, direct connections between end-user devices having virtualized routing capabilities are utilized in a file transfer context, such as, for example, with a file sharing application.

Figure 8:
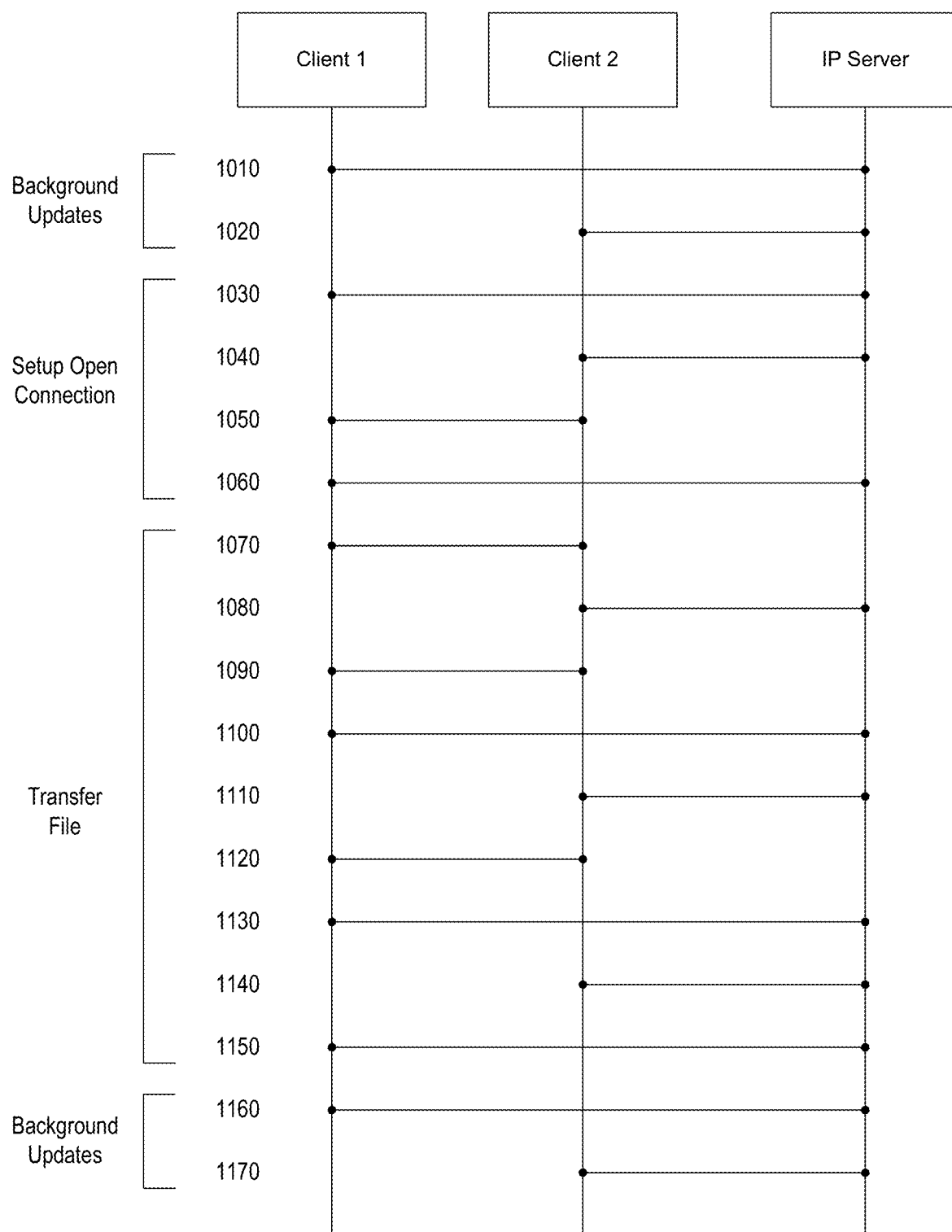
FIG. 8 illustrates an exemplary process for direct transfer of a file from a first client to a second client in accordance with one or more preferred implementations.

FIG. 8 illustrates an exemplary file transfer use scenario between two clients. As described above, each client is in communication with an IP server, for example to communicate its IP address to the IP server. Such communications are exemplified by steps 1010 and 1020.

In use, a first client communicates to an IP server a request to connect to a particular client, user, or end-user device at step 1030. The IP server, or control server, determines whether or not the other client, user, or end-user device is available, e.g. online, and, if so, looks up the current IP address or addresses associated with the specified client, user, or end-user device. If the client, user, or end-user device is either not online or has left the network, a connection failure message is sent. If the client, user, or end-user device is online, the IP server will take action based upon a pre-selected preference setting. Preferably, each user may choose to accept connection requests automatically, require a confirmation of acceptance, or require some other authentication information, such as an authentication certificate, in order to accept a connection request. If the connection request is accepted, either automatically or manually, the IP server enables the transfer, e.g. by communicating to a second client that the first client has a file for transfer, as exemplified by step 1040.

Preferably, the IP server notifies each client involved in the transfer of required security levels and protocols, such as, for example, hashing algorithms used to confirm that received packets have not been altered. The IP server also insures that the client software at each end-user device has not been tampered, altered, or hacked.

The clients complete a messaging "handshake", and then begin transfer of a file. More specifically, the second client requests a connection with the first client at step 1050, the first client notifies the IP server of its status, e.g. that it is beginning a transfer, at step 1060, the first client grants the second client's request at step 1070, and the second client notifies the IP server of its status, e.g. that its connection request was accepted, at step 1080. The file transfer begins at step 1090.

Periodically, both clients will update the server on the status of the download, as illustrated by exemplary steps 1100 and 1110. The server will keep track of the file transfer and compare the information received from both clients for completeness and security. Once the file transfer is completed, at step 1120, a status is sent of each client is sent to the IP server at steps 1130 and 1140, and the connection is terminated at step 1150. The clients continue to update their availability with the IP server for future downloads, as illustrated by exemplary steps 1160 and 1170.

It will be appreciated that because one of the problems with the TCP/IP protocol is that significant timing delays can occur between communications, using a virtual machine advantageously allows messages to be sent at the lowest levels of the stack between virtual machines of different clients, thus helping insure that communications are not delayed. Further, the inclusion of local routing capabilities enables each client to setup another communication link, if needed, for example to continue a stalled download. Further still, as preferably both clients include such routing capability, either client can reinitiate a separate communication to the other client, thus helping insure that TCP/IP packet delay timeouts do not draw out the communication.

Additionally, to facilitate more robust transfers, one of the clients can instruct the other to open other TCP/IP connections independent of the server link. For example, a first client may receive an IP address for a second client via the IP server, and the second client could then communicate additional IP addresses to the first client and communicate duplicate packets via connections established with these additional IP addresses, thus increasing the reliability of the link. Additionally, the client could send multiple packets over separate IP addresses to insure a different starting point for transmission, and thus insure unique paths. It will be appreciated that this might advantageously allow for the continuing transfer of packets even if one of the connection paths fails. Notably, each path is closed upon completion of the transmission.

Figure 9B:
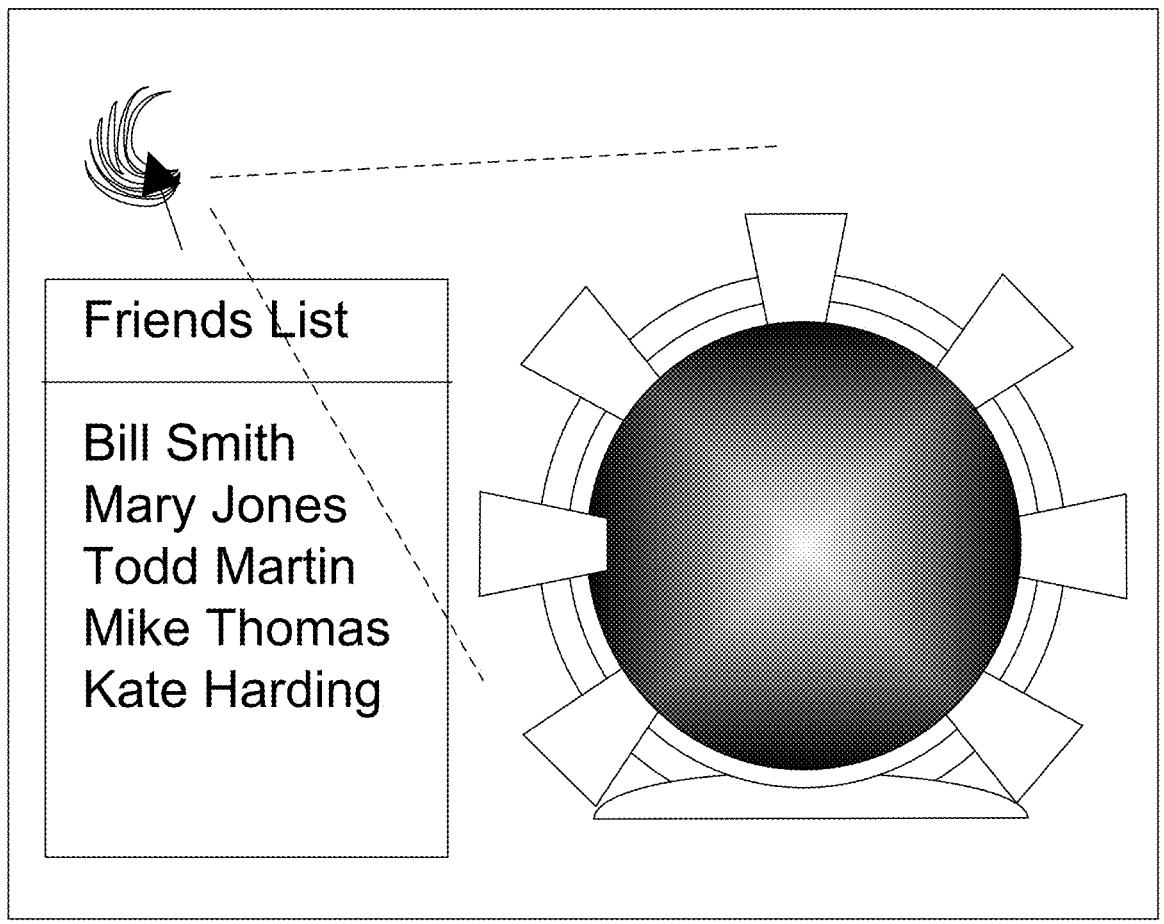
FIG. 9B illustrates an exemplary user interface for a Sharzing file transfer application in accordance with one or more preferred implementations.

FIG. 9 illustrates a user interface for an exemplary file sharing application in accordance with a preferred implementation. To initiate a transfer, a user clicks on an application icon to open the user's Friend's List and a "Sharzing" window. Bold texted names identify on-line contacts, while grey texted names indicate off-line contacts. When the blades of the graphical connection representation on the right side of the window, i.e. the Sharzing, are shut, the Sharzing is inactive. Clicking on an on-line contact opens the blades and establishes a Sharzing connection. The user may then "drag and drop" a file onto the open Sharzing.

Once a Sharzing connection is established, multiple files can be transferred in either direction. Further, multiple Sharzings can be opened simultaneously to different users. Preferably, when a Sharzing is connected, wallpaper of the opposite PC that is being connected to is displayed. As a file is "dragged and dropped" on the Sharzing, the Sharzing displays the progress of the file transfer. Using a a Sharzing skin, a Sharzing depiction can take on identities such as, for example, a futuristic StarGate motif. In the case where such a StarGate motif is used, flash wormhole turbulence may begin when a file is placed in the Sharzing, and, subsequently, an opening at the end of the wormhole may emerge to display an image of the file and/or the recipient's desktop wallpaper. Preferably, when the transferred file is visible on the destination desktop, the transfer is complete.

Many Clients to Many Clients—Video and Audio Conferencing Implementation

In another preferred implementation, direct connections between end-user devices having virtualized routing capabilities are utilized in a telecommunications context, such as, for example, in an audio and video conferencing application.

It will be appreciated that in traditional audio and video conferencing applications, one or more conventional servers act to collate and process audio and video streams from a plurality of clients, and then distribute the processed audio and video streams to the clients. By way of contrast, in a preferred implementation, an end-user device can instead establish a direct connection with another end-user device, and communicate audio and video directly to the other end-user device, rather communicating through a conventional server. In such implementations, this transmitted audio and video can be directly processed by either a communicating end-user device, a receiving end-user device, or both, rather than by a conventional server.

As described above, via the use of virtualization, a first end-user device can establish a direct connection with not just one other end-user device, but with multiple other end-user devices. The first end-user device provides each other end-user device with its video and audio stream, thus effectively acting as a server by "serving" its video and audio stream to each other end-user device. Each of the other end-user devices involved in a video conference will receive such video and audio streams served by this first end-user device; however, each other end-user device will additionally serve its own video and audio streams. Thus, each end-user device can be characterized as functioning as both a server and a client, possibly at the same time, i.e. as a multiplexed client/server.

Notably, however, although the end-user devices assume some functionality more traditionally assumed by a conventional server in video conferencing applications, a control server is preferably still used to oversee the establishment and maintenance of connections between end-user devices. Unlike in a traditional implementation, however, it is preferred that little to no audio or video processing is handled at this control server, and that the audio and video streams between end-user devices are not routed through the control server.

Instead, the control server primarily provides authentication and security functionality. Preferably, the control server keeps track of a unique identification of each end-user device, software loaded on each end-user device, and an IP address of each end-user device. Additionally, the control server preferably controls which end-user devices can communicate, and at what times they may communicate. For example, the control server preferably provides functionality allowing a moderator to "talk" over every other user at any given time.

Each end-user device preferably continually provides information to the control server, including: a status of the end-user device, whether the end-user device is receiving audio, whether the end-user device has lost its connection, an application status, application data, whether software at the end-user device has been tampered with, a rate of one or more communication links, and a packet error rate of one or more communication links.

Use with Conventional Servers—Media Server Implementation

In some preferred implementations, direct connections between end-user devices having virtualized routing capabilities are utilized in combination with one or more conventional file servers, such as, for example, in a media server application. Specifically, it will be appreciated that the conventional downloading of data, such as a video file, from a server is an intensive process that utilizes precious server processing, memory, and bandwidth. In preferred implementations, some of the strain of this process is offloaded from such a conventional server to one or more end-user devices having virtualized routing capabilities. This architecture decreases the processing, memory requirements and bandwidth loads on a media server. Table 2 of FIG. 10 shows the relationship for a media file that is being downloaded from a server when some of the strain of multiple download requests is transferred off of the media server in accordance with such preferred implementations.

Figure 11:
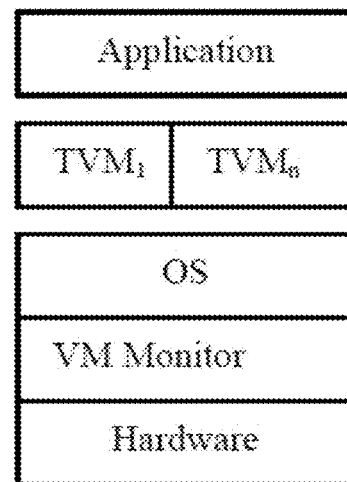
FIG. 11 illustrates client and server architectures in accordance with one or more preferred implementations.
Figure 11:
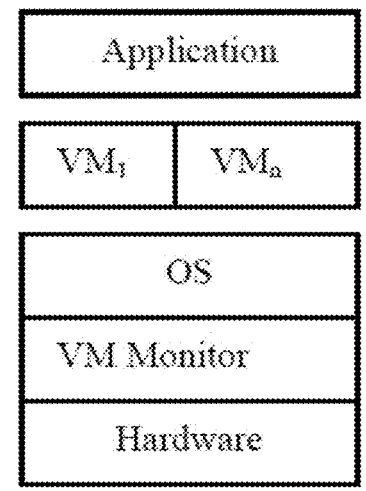

In a preferred implementation, a plurality of end-user devices comprise VDR clients, and a control server comprises a VDR server, each respectively including the architecture illustrated in FIG. 11.

Figure 12:
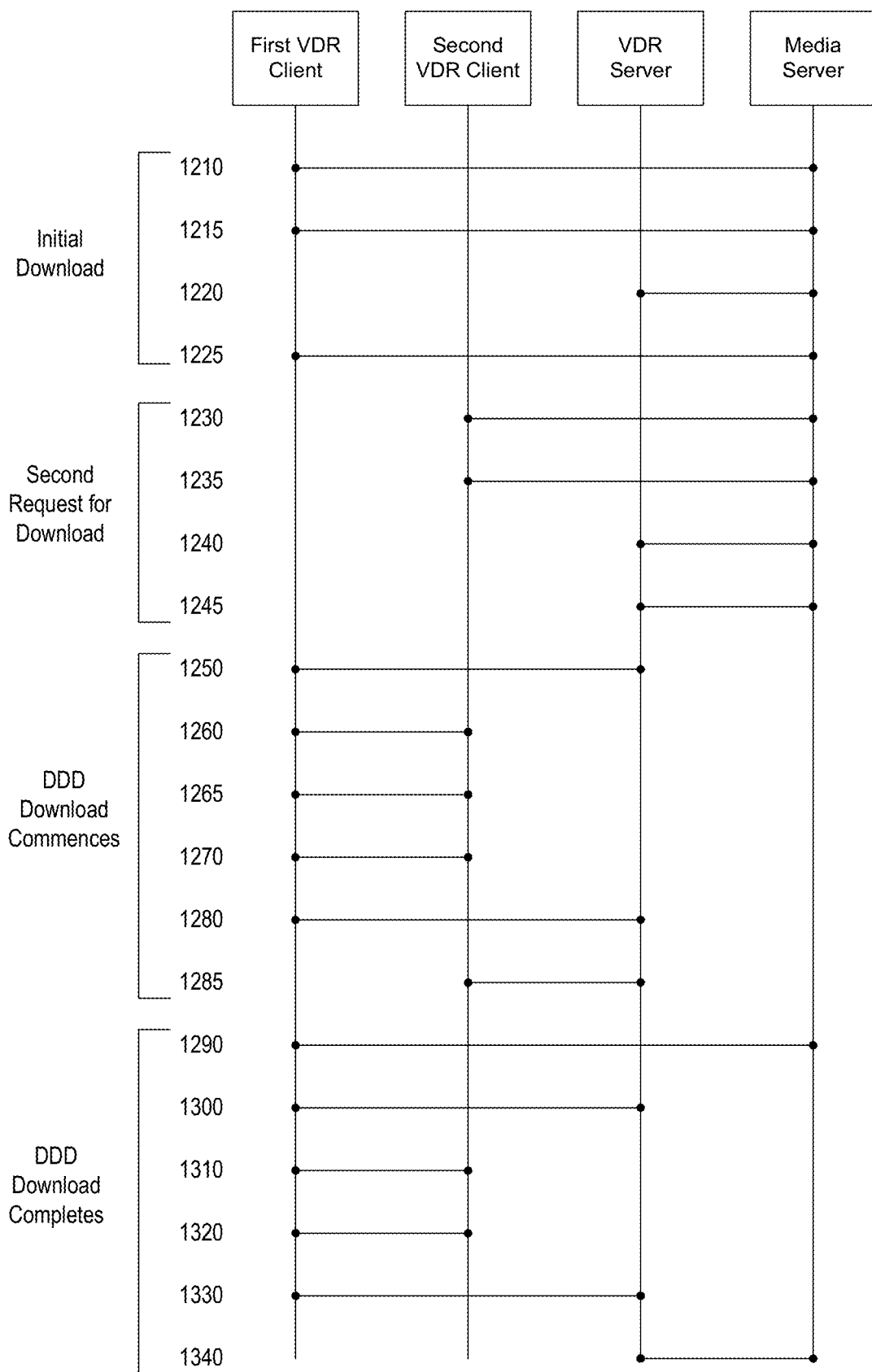
FIGS. 12 and 13 illustrate exemplary processes for downloading of a file in accordance with one or more preferred implementations.

FIG. 12 illustrates an exemplary process for downloading media content to two VDR clients that was originally stored on a customer video server, i.e. a media server. Notably, the process involves not just the two VDR clients and the media server, but also a VDR server as well.

The process begins when the first VDR client requests download of media content from the media server at step 1210, followed by a corresponding TCP/IP handshake at step 1215. Subsequently, the media server alerts the VDR server of the download at step 1220. The VDR records the activity of the first VDR client along with necessary identification and contact information for the first VDR client. The media server follows the typical download procedure and begins the download to the first VDR client at step 1225.

Thereafter, a second VDR client requests the same media content from the media server at step 1230, followed by a corresponding TCP/IP handshake at step 1235. At step 1240, the media server alerts the VDR server to the download request by the second VDR client. The VDR server determines that a VDR client is active, gathers addressing information for the second VDR client, and notifies the media server that it will handle the download at step 1245. Notably, a VDR client is active as long as its connection is active. It will be appreciated that several methodologies may be used to determine how long a client stays active. In at least some implementations, a client is shut down, i.e. rendered inactive, immediately after a file is transferred, which may represent the most efficient use of resources. In a preferred implementation, a timer is utilized, and the client remains active a user-specified number of minutes following activity. Alternatively, a client's connection could be left open until the user wants to close it, or until a network timeout occurs.

At step 1250, the VDR server communicates to the first VDR client and configures it for download capability to the second VDR client, e.g. using the obtained addressing information for the second VDR client. The second VDR client initiates communication with the first VDR client for download of the media content from the first VDR client at step 1260, followed by a corresponding TCP/IP handshake at step 1265, and the download then begins at step 1270.

Notably, the first VDR client, like most clients, has bandwidth available on the uplink when downloading content. It is believed that a typical personal computer, as of the filing date of this application, can handle 3-5 uploads without significant burdening or performance degradation.

Communication between the first and second VDR clients is accomplished between "Thin Virtual Machines" (TVM) of each VDR client. Each TVM is characterized as a "thin" virtual machine, as each preferably generally includes only functionality necessary to support virtualized networking, and, preferably, optimizes the resources needed to support the virtualization of the Network Interface Card (NIC). As will be appreciated from the description hereinabove, each TVM enables each application to have a separate virtual interface to the NIC. This functionality enables customized security capabilities that can be added to each application interface individually.

At steps 1280 and 1285, the VDR clients convey status information, e.g. concerning the download, to the VDR server. At step 1290, the first VDR client completes its download of the media content from the media server. The first VDR client continues the download to the second VDR client, however. While the download continues, status information is sent to the VDR server from each VDR client as exemplified by step 1300. Further, the first and second VDR clients continue to communicate via the virtual machine interface to detect connection issues and reroute packets.

The download continues at step 1310. At step 1320, the second VDR client completes its download, and each VDR client notifies the server of such success, as exemplified by step 1330. The VDR server, in turn, notifies the media server that the download to the second VDR client was completed successfully at step 1340.

If, instead of being completed successfully, the second VDR client's download of the media content had not completed, the second VDR client would have contacted the VDR server for another download opportunity.

Figure 13:
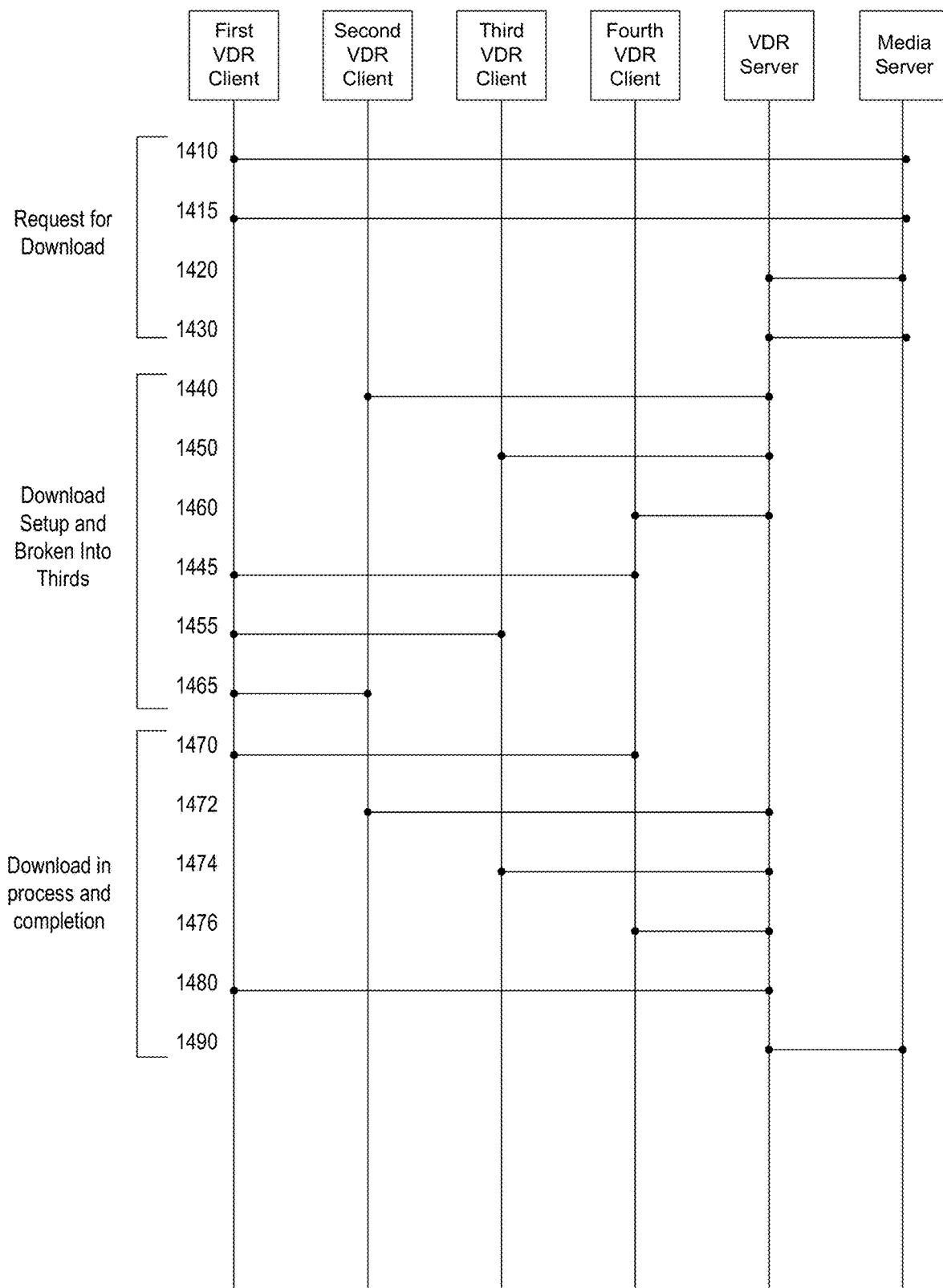

FIG. 13 illustrates another exemplary process where, rather than downloading media content from one other VDR client, media content is downloaded from a plurality of VDR clients, thus increasing the speed of download.

More specifically, a media file is broken into fragments, and each fragment is downloaded to a target VDR client from a different source VDR client using a different connection. In FIG. 13, the process begins when, at step 1410, a first VDR client communicates a download request to a media server, followed by a corresponding TCP/IP handshake at step 1415. At step 1420, the media server alerts the VDR server that a download has been requested. The VDR server determines that multiple VDR clients are available to download the requested media content from, and, at step 1430, the VDR server informs the media server that it will handle the download request. At steps 1440, 1450, and 1460, respectively, the VDR server communicates to second, third, and fourth VDR clients and passes addressing information corresponding to the first VDR client to each. The VDR server assigns each VDR client the portion of the media content that that VDR client will download to the first VDR client.

The first VDR client then downloads, at steps 1445, 1455, and 1465 respectively, the assigned portions of the media content from each of the other VDR clients. As exemplified by illustration of steps 1470, 1472, 1474 and 1476, each VDR client reports to the VDR server status information on any downloads it is a part of, to insure each download is progressing as planned. If a connection is lost, the VDR server can act to correct the problem. Once the first VDR client has completed the download of the media content, it communicates such completion to the VDR server and each other VDR client, as exemplified by illustration of step 1480. Subsequently, the VDR server notifies the media server that the download was completed at step 1490.

MMORPG Implementation

In another preferred implementation, direct connections between end-user devices having virtualized routing capabilities are utilized in a gaming context, such as, for example, in a massively multiplayer online role playing game application.

It will be appreciated that traditional MMORPGs handle the majority of processing for a game world at conventional servers. In a preferred implementation, some of this processing work is offloaded to end-user devices having virtualized routing capablities. For example, each end-user device preferably functions as a server for serving an avatar associated with a user to other end-user devices whose users are disposed, in the game world, in close proximity. In this way, the processing associated with such avatars is largely offloaded from the server.

This offloading, and other similar offloading, reduces the resources required by an MMORPG server. Notably, however, although the end-user devices assume some functionality more traditionally assumed by a conventional server in MMORPG applications, a control server is preferably still used to oversee the establishment and monitor connections between end-user devices.

The control server preferably provides authentication and security functionality. Preferably, the control server keeps track of a unique identification of each end-user device, software loaded on each end-user device, and an IP address of each end-user device. Additionally, the control server preferably controls what actions each client can take.

Each end-user device preferably continually provides information to the control server, including: a status of the end-user device, whether the end-user device has lost its connection, an application status, application data, whether software at the end-user device has been tampered with, a rate of one or more communication links, a packet error rate of one or more communication links, a game state, a character state, and coordinates of the character's location in the game world.

It will be appreciated that voice conferencing can be an important part of the massive multiplayer experience, and, in accordance with one or more preferred embodiments, functionality and implementation similar to that outlined in an audio conferencing context is utilized in a massively multiplayer gaming context as well.

Notably, in such implementations, a client both receives information from other clients, for example in the form of avatar information, and additionally receives information from a content server, which may also comprise control server functionality.

Security

Preferably, in secure implementations, clients at end-user devices are alerted by a control server of an impending transfer and utilize a secure protocol such as public key encryption, AES (Advanced Encryption Standard), or SSL (Secure Socket Layer). Packets to be transferred are preferably intercepted by a virtual machine of a first client, prior to being sent to the network interface of that client, and encrypted. Following receipt, the packets coming out of the network interface are then intercepted by a virtual machine of the other client and decrypted.

Preferably, strong security is achieved by employing a single encryption key that is passed between the two end-user devices controlled at layer 2 and 3 of the OSI (Open Source Interface) stack model. Regardless of whether the file is transported via Ethernet, WiFi, mobile phone data networks, or other wired or wireless technologies, the file is protected since it is decrypted at the router level of the destination before the data is passed to the application.

Although systems, methods, and apparatus are described herein largely in the context of end-user devices having virtualized routing capabilities, it will be appreciated that at least some implementations may be practiced in the absence of such virtualized routing capabilities.

Notably, virtualized routing capabilities, such as, for example, those presented by a VDR client, may be advantageous even in communicating with a client that does not enjoy such capabilities, e.g. a non-VDR client. In a preferred method, a VDR client in communication with a non-VDR client searches incoming packets for viruses or other anomalies, and, if such other anomalies are found, the VDR client can break off communications and re-establish a new connection.

Deflects and Spread Spectrum Networking

Figure 14:
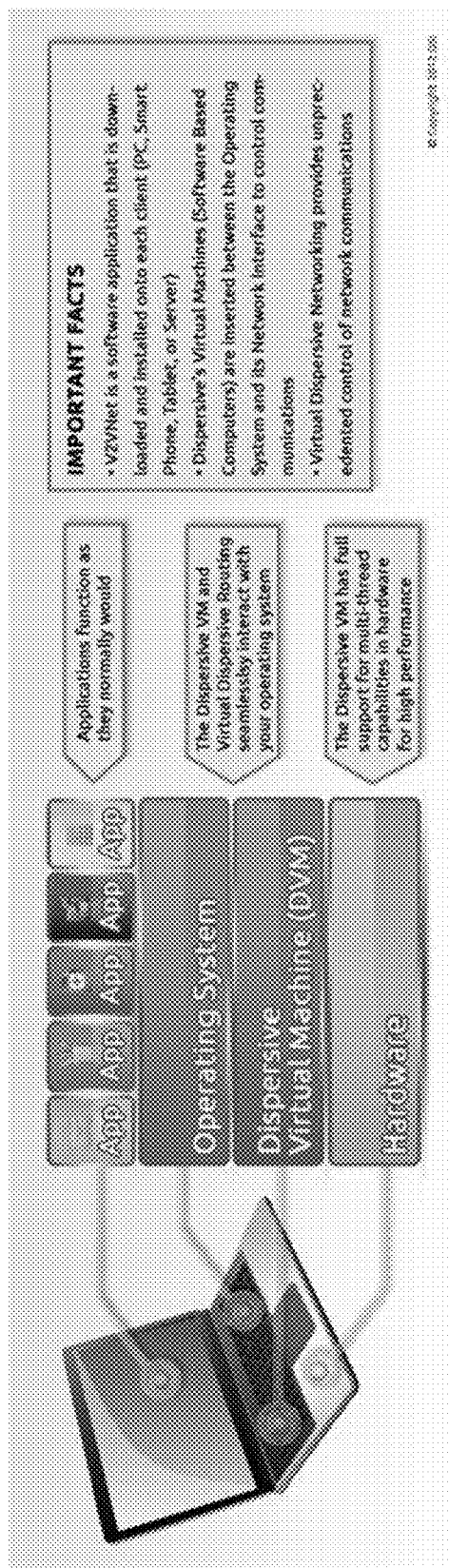
FIG. 14 illustrates the use of a dispersive virtual machine implemented as part of a software application that can be easily downloaded to a device such as a PC, smart phone, tablet, or server.

FIG. 14 illustrates the use of a dispersive virtual machine implemented as part of a software application that can be easily downloaded to a device such as a PC, smart phone, tablet, or server. In accordance with a preferred methodology, data to be sent from a first device utilizing such software to another device is split up into multiple parts which are sent separately over different routes and then reassembled at the other device.

Figure 15:
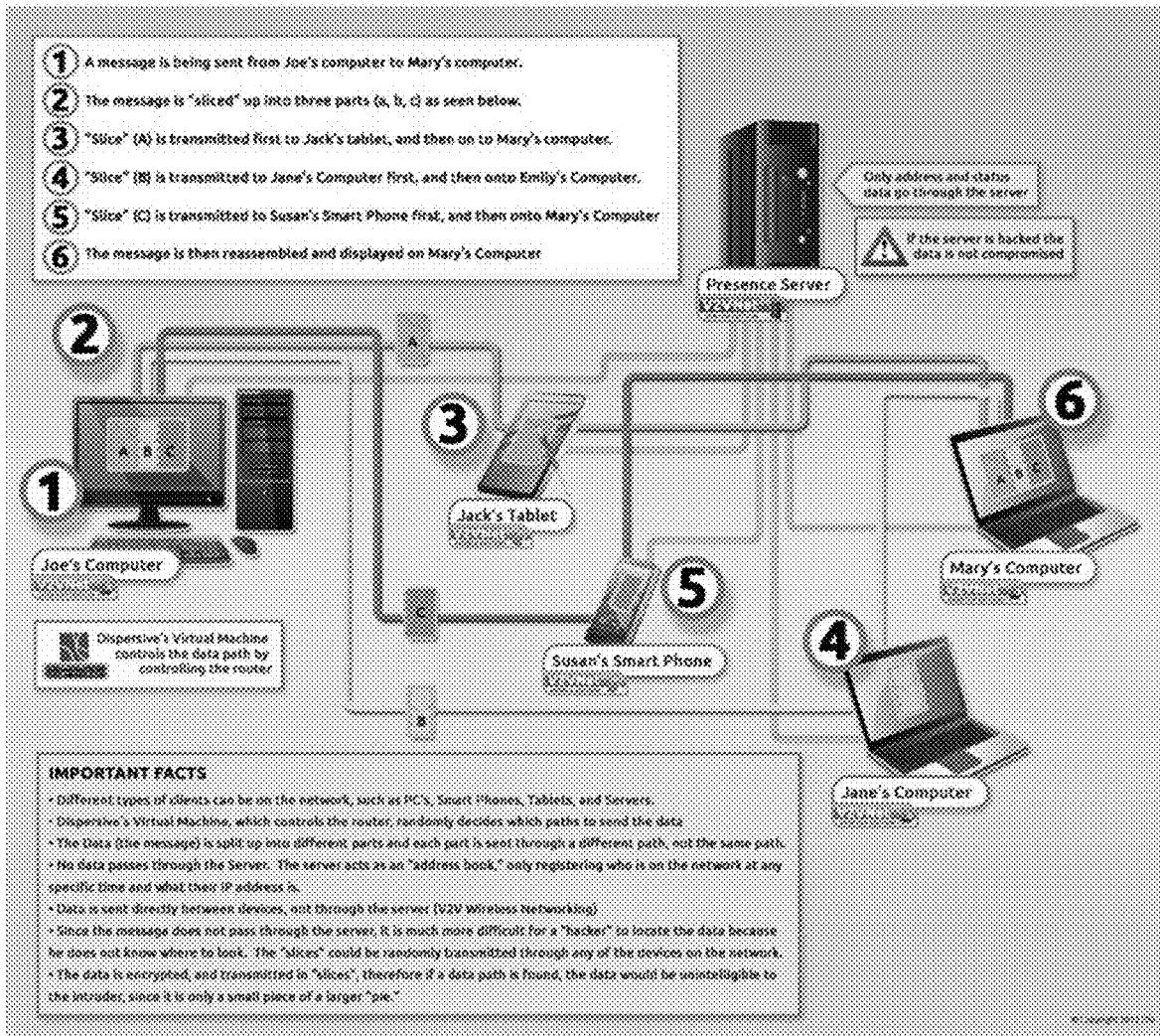
FIG. 15 illustrates a methodology in which data to be sent from a first device to another device is split up into multiple parts which are sent separately over different routes and then reassembled at the other device.

FIG. 15 illustrates an exemplary such methodology utilizing one or more such exemplary software applications in which a message sent from a first user's (Joe's) computer to a second user's (Mary's) computer is split up into three parts, each part is transmitted to a different device also running such an exemplary software application, and each different device then retransmits such received part to the second user's (Mary's) computer. The message is then reassembled and displayed on the second user's (Mary's) computer. In this scenario, each of the three different devices that the message is communicated to for retransmission can be characterized as a "deflect", in that rather than sending the message directly to the second user's (Mary's) computer, the message is first intentionally "deflected" through such different devices. Notably, although complete control of routing over one or more networks a message will pass through may not be available, by choosing to utilize one or more such deflects, multiple paths can be selected and utilized.

It will be appreciated that splitting a message into three parts and sending such parts over three separate routes makes it more difficult to intercept such message. Leveraging the deflect capability of virtual dispersive routing, packets can be sent independent routes from one another, thus ensuring packets cannot be captured by copying packets off the Internet from a single router.

Different parts of a message could be sent all at once over different network paths, or, in at least some preferred implementations, a network path could be changed over time, for example, a device could be configured to utilize a different deflect after a certain period of time or after a certain number of packets are communicated.

Additionally or alternatively, however, in one or more preferred implementations, rather than utilizing multiple deflects to send packets over multiple network paths and/or change network paths, network communications utilize one or more network addresses and/or ports. Preferably, this includes concurrent communication of packets to multiple network addresses and/or ports of another device, and/or changing or shifting of the network address and/or port that packets are communicated to. Such spreading of packets across multiple IP addresses and ports can be characterized as spread spectrum networking (SSN).

In one or more preferred implementations, by constantly changing the IP address and/or ports that a computer device utilizes to talk to another computing device (e.g. P2P (peer to peer) or V2V (virtual machine to virtual machine)), it becomes much more difficult to track the device. In one or more preferred implementations, virtual machines are utilized to provide signaling and measure delay between hops.

Figure 16:
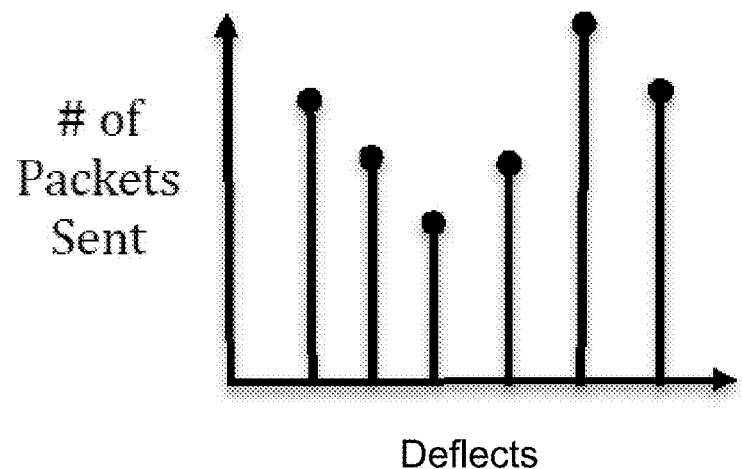
FIG. 16 illustrates how multiple packets can be sent over different deflects in a direct spreading of packets methodology.
Figure 17:
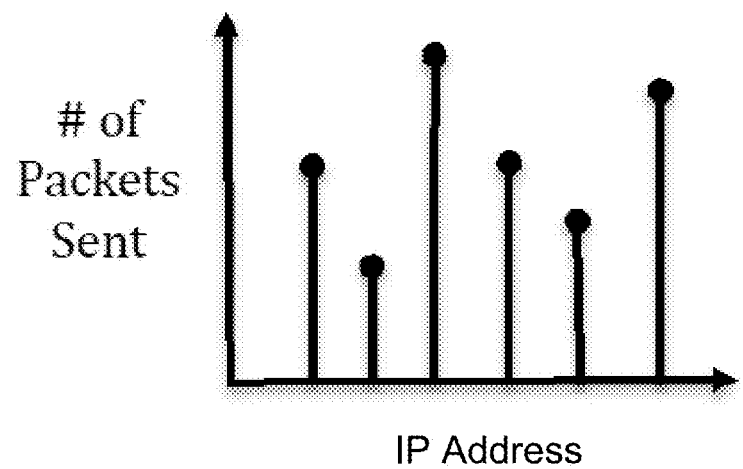
FIG. 17 illustrates how multiple packets can be sent to different IP addresses and/or ports in a hopping IP addresses and ports methodology.

FIG. 16 illustrates how multiple packets can be sent over different deflects in a direct spreading of packets methodology, and FIG. 17 illustrates how multiple packets can be sent to different IP addresses and/or ports in a hopping IP addresses and ports methodology.

Figure 18:
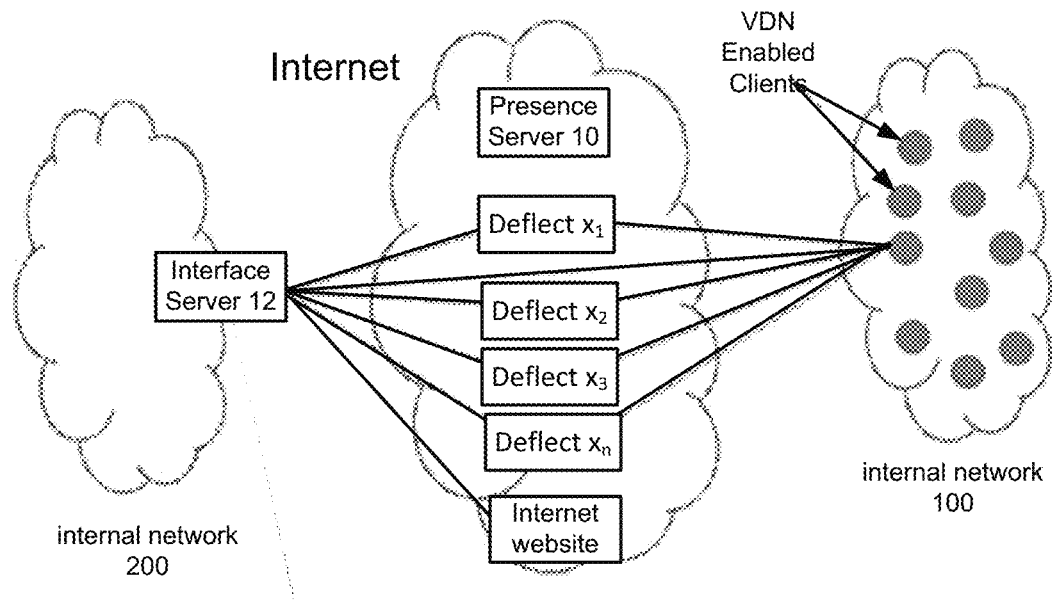
FIG. 18 illustrates an exemplary system architecture configured to allow clients in a task network to access the Internet through an interface server using virtual dispersive networking (VDN) spread spectrum protocols.

FIG. 18 illustrates an exemplary system architecture configured to allow clients in a task network to access the Internet through an interface server using virtual dispersive networking (VDN) spread spectrum protocols.

The exemplary system illustrated in FIG. 18 includes a task network with ten VDN enabled client devices, a dispersive presence server, four deflect servers, and an interface server. In a preferred implementation, the task network client machines and the interface server will be hosted by a first entity at a particular location or facility, and the presence server and deflects will be hosted by another entity at disparate geographic locations.

Each of the task network client machines has installed thereon VDN software that includes a Xen hypervisor with CentOS host operating system containing virtual dispersive networking components. Each client machine further includes two Windows guest operating systems. The VDN components are configured to provide connectivity for one of the guest operating systems to the Interface Server through multiple deflects. This interface server provides access to internet sites such as Google for one of the guest operating systems for each of the task network clients. The VDN components provide connectivity for the other guest operating system only to the internal task network.

The interface server has installed thereon VDN software that includes a Xen hypervisor with CentOS host operating system containing virtual dispersive networking components. The interface server further includes software configured to provide connectivity to the internet from the interface server. Dispersive presence server software and deflect server software is installed on geographically dispersed hosted servers.

All of the client machines and servers are configured to provide desired connectivity using virtual dispersive networking. Configuration of software is preferably adjusted as required based on performance metrics developed through testing.

Figure 19:
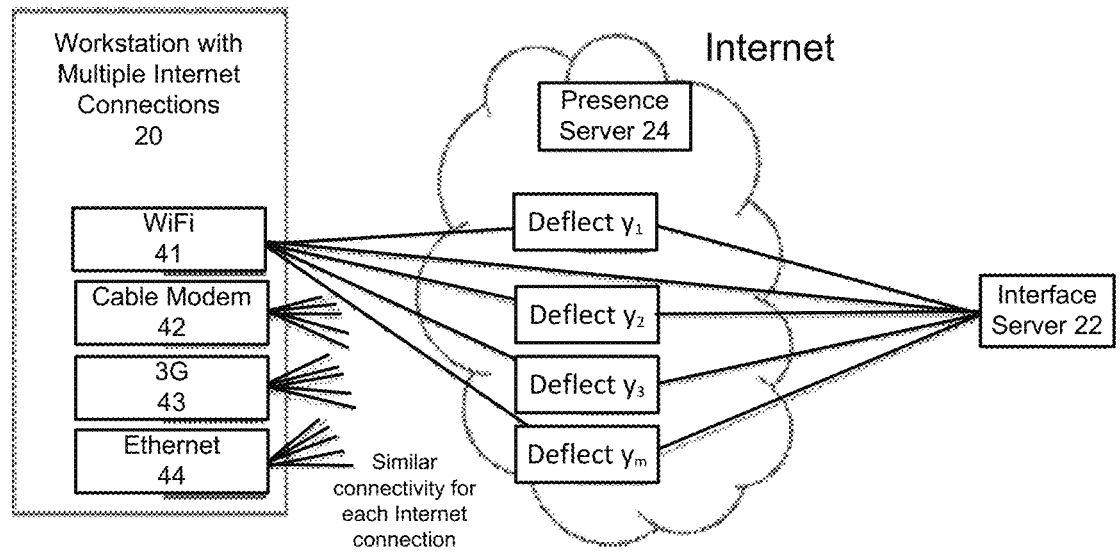
FIG. 19 illustrates an exemplary system architecture configured to enable a workstation with four independent connections to the internet to send traffic using virtual dispersive networking spread spectrum protocols to an interface server from each independent internet connection.

FIG. 19 illustrates an exemplary system architecture configured to enable a workstation with four independent connections to the internet to send traffic using virtual dispersive networking spread spectrum protocols to an interface server from each independent internet connection.

The exemplary system illustrated in FIG. 19 includes a workstation configured with four independent connections to the internet and including VDN software configured to simultaneously utilize the independent connections. The system further includes an interface server, a dispersive presence server (DPS), and four deflect servers.

In this exemplary system, the servers are configured as described hereinabove with respect to FIG. 18, while the workstation is loaded with VDN software that includes a Xen hypervisor with CentOS host operating system containing Virtual Dispersive Networking components. The workstation also has loaded thereon guest operating systems. The VDN components provide connectivity for the guest operating systems to the Interface Server through multiple deflects and through each of the independent connections to the internet.

Point of Entry Gateways

In one or more preferred implementations, VDN systems use a DPS for connection processing and collecting network information on a client population. The connection processing on the DPS communicates with the virtual networking machines on the end clients to make connections between the two end-points of the segments that make up a VDN communication (that is, two end clients).

In one or more preferred implementations, however, some of the functionality handled by a DPS is spawned out to intermediate network computing points (e.g. servers), which can then be in communication with the DPS. In one or more preferred implementations, one or more point of entry gateways are utilized in this manner. These point of entry (PoE) gateways, as their name implies, serve as a point of entry for devices (such as end clients) seeking to communicate with the DPS, by receiving communications intended for the DPS and forwarding them on (either with or without processing at the PoE gateway).

In one or more preferred implementations, PoE gateways are utilized in combination with a DPS behind a firewall. That is, the DPS remains behind a firewall, while the PoE gateways are exposed. Thus, by spawning processes out to intermediate network computing points (e.g. the PoE gateways), this enables the database and call processing software control of the DPS to remain behind the firewall. The data needed by the PoE gateways will be specific to a particular VDN and also provide other generic PoE gateway devices to diversify the network connection.

FIGS. 20-23 illustrate an exemplary scenario utilizing PoE gateways.

Figure 20:
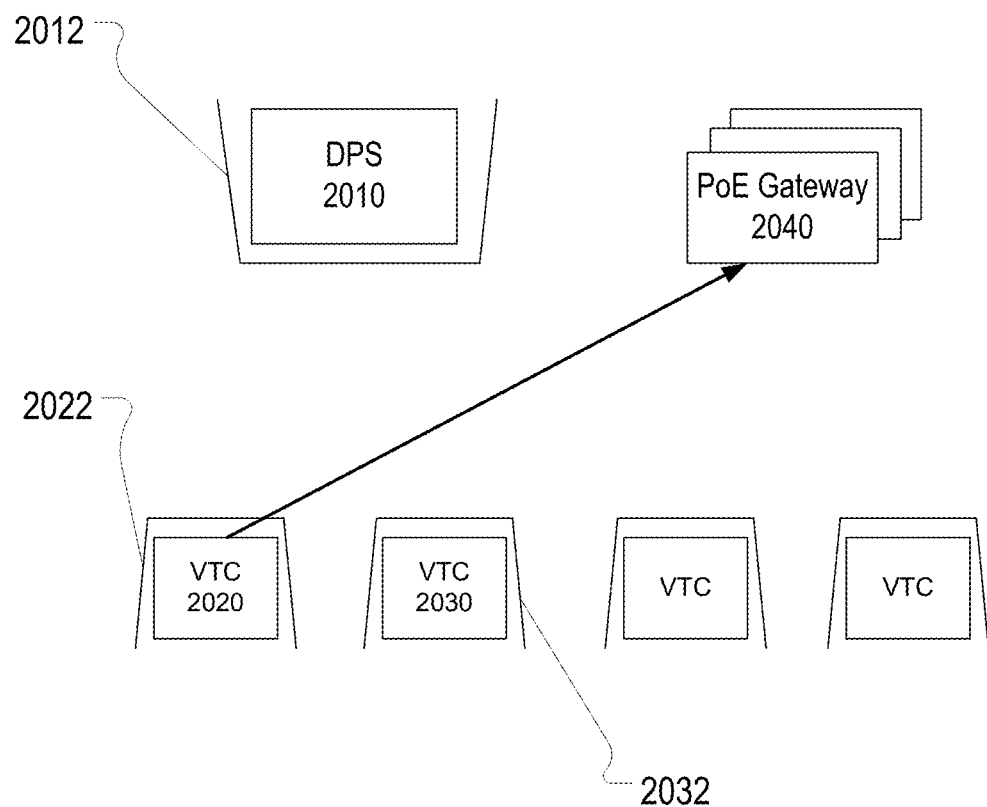
FIGS. 20-23 illustrate an exemplary scenario utilizing point of entry gateways.
Figure 21:
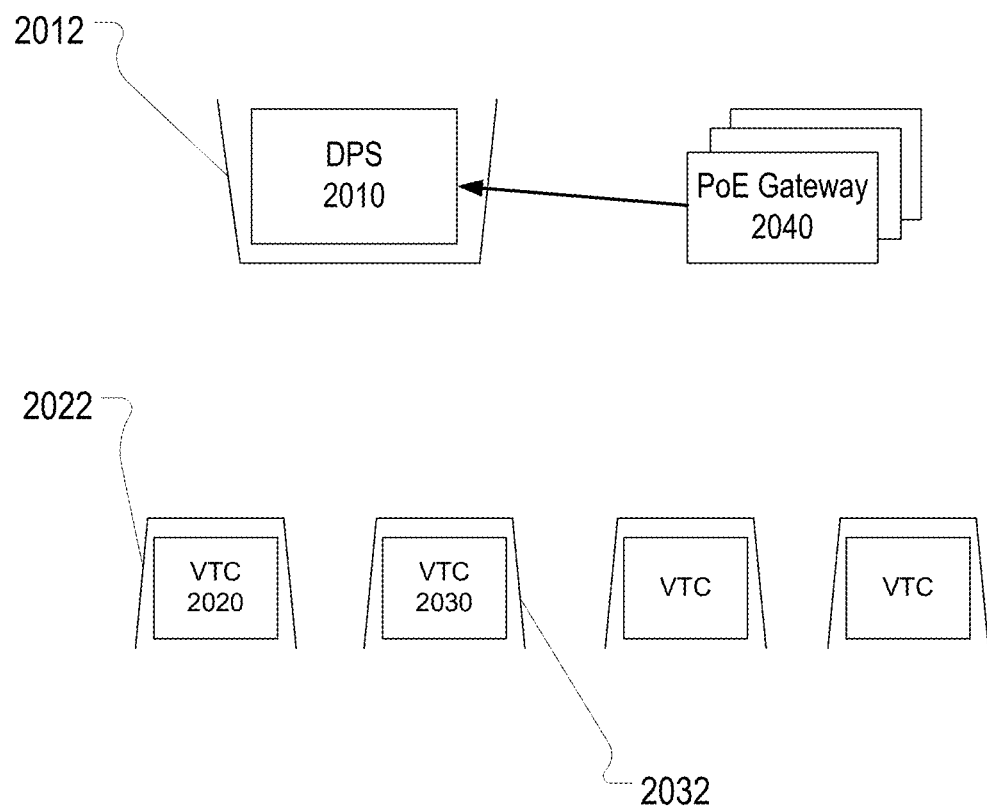
Figure 22:
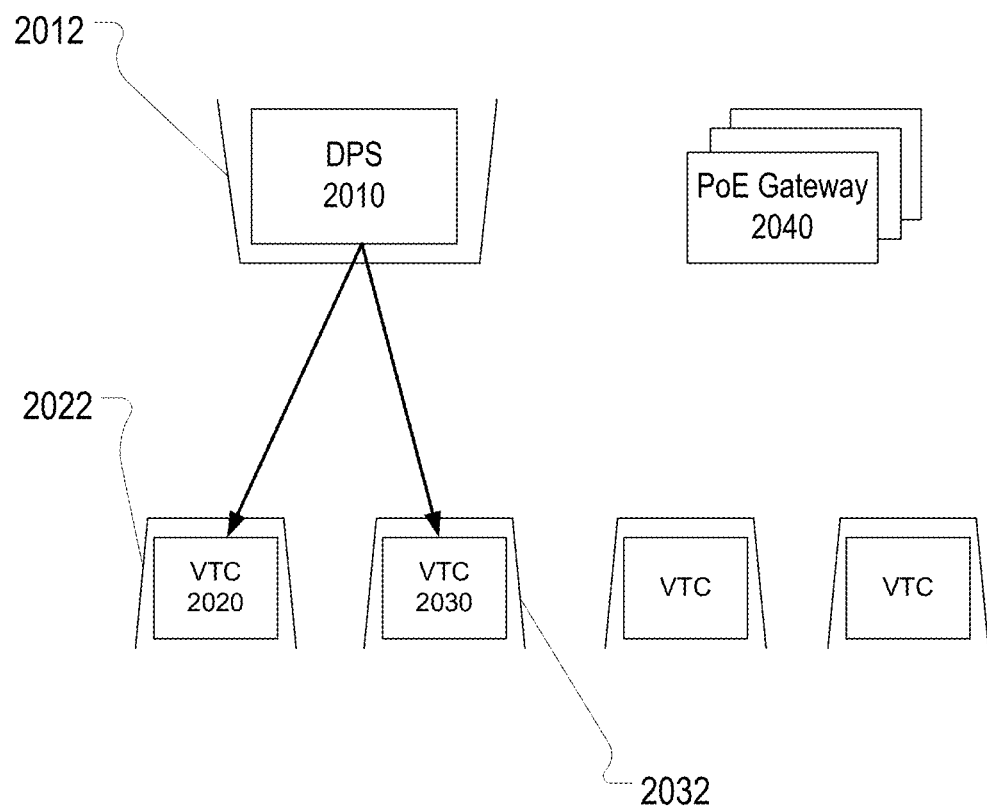
Figure 23:
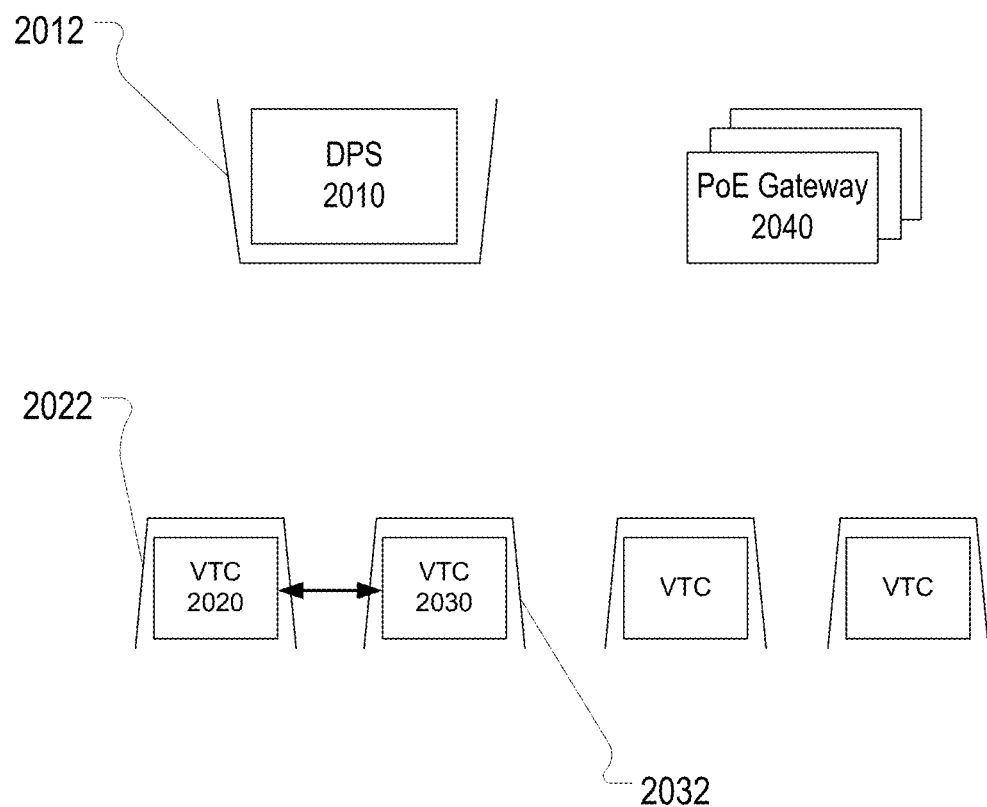
Figure 24:
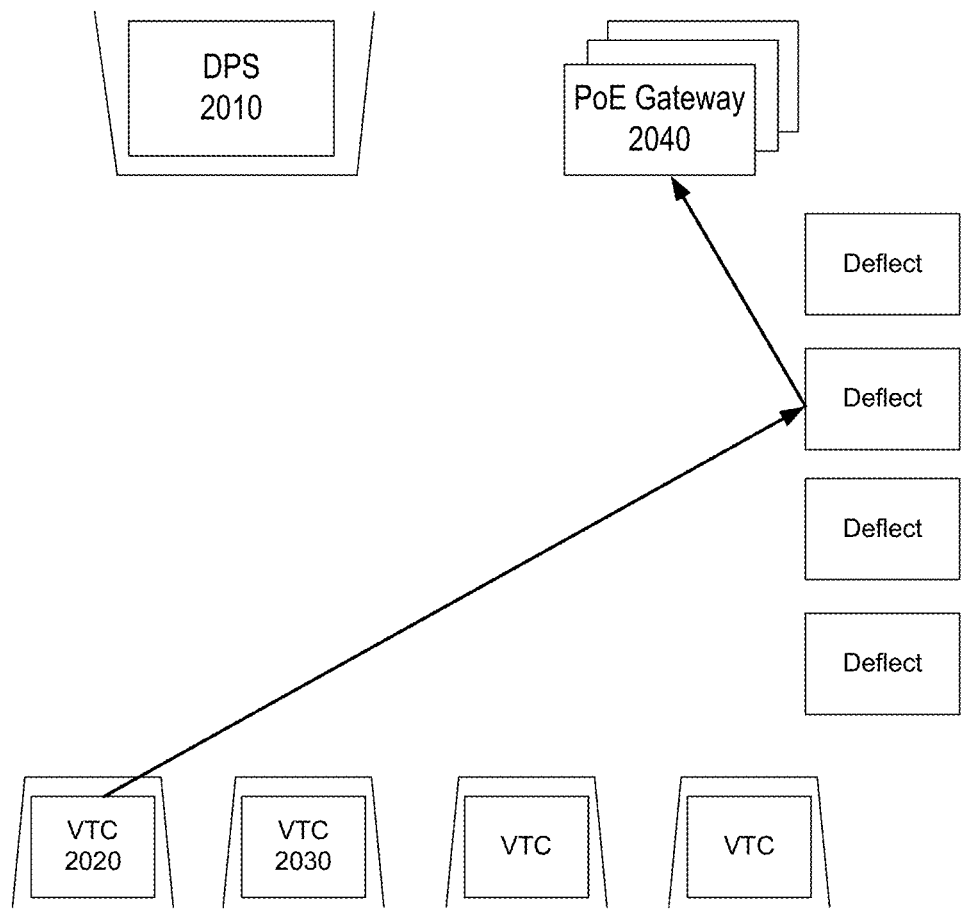
FIGS. 24-27 illustrate a similar scenario as that illustrated in FIGS. 20-23, only one or more deflects utilized for some communications or connections.
Figure 25:
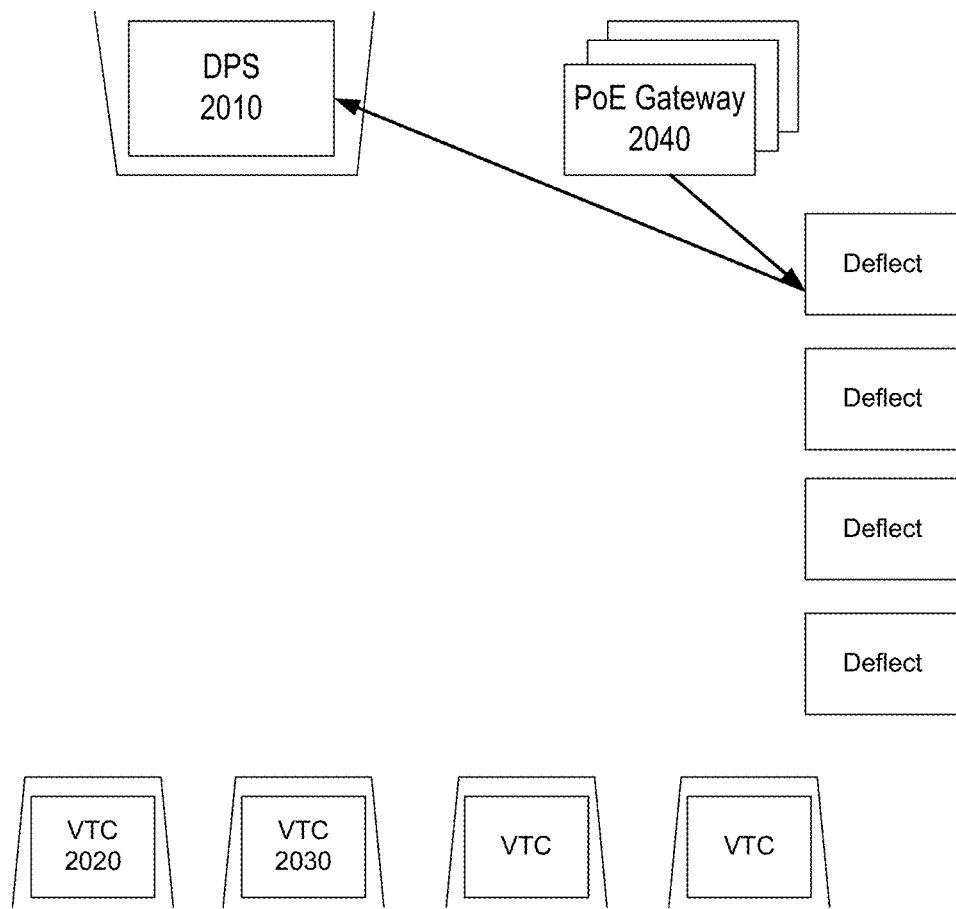
Figure 26:
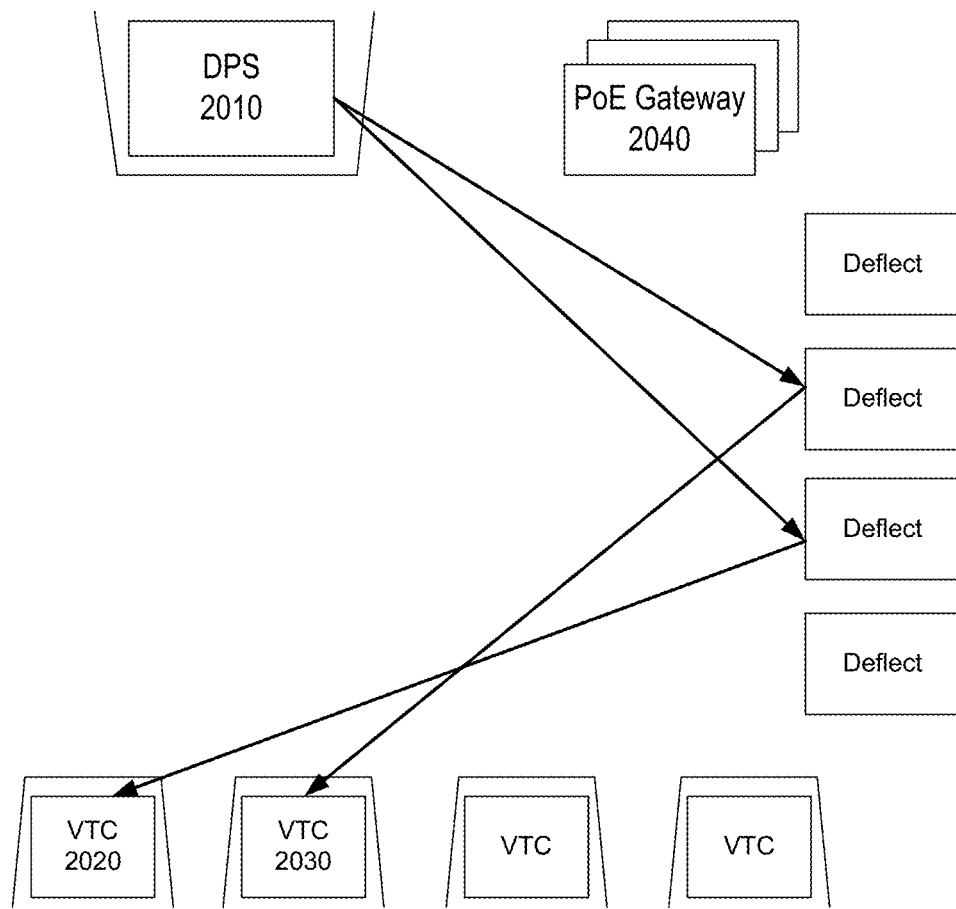
Figure 27:
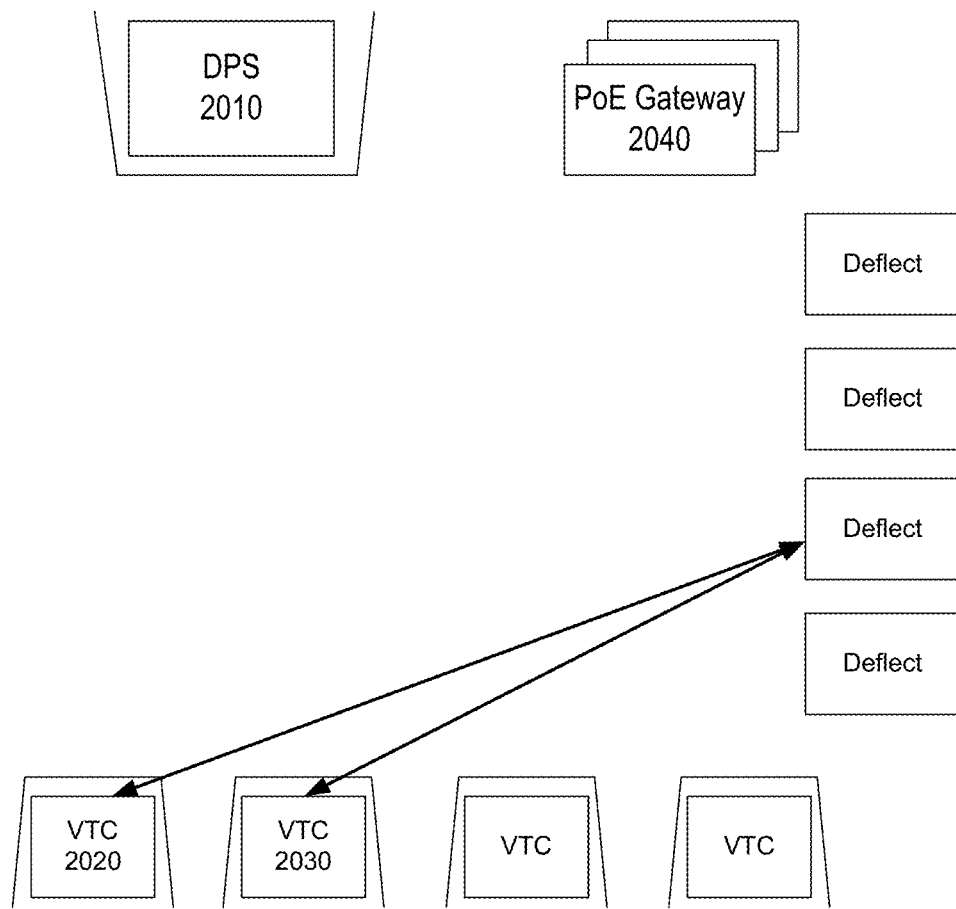

An end client 2020 configured for VDN (behind a firewall 2022) seeks to establish a connection with another end client 2030 (behind a firewall 2032). The end client 2020 communicates a message requesting information for such a connection to a PoE gateway 2040 of a plurality of PoE gateways, as illustrated in FIG. 20. The PoE gateway 2040 then communicates the message on to the DPS 2010 (behind a firewall 2012), as illustrated in FIG. 21. Thereafter, the DPS 2010 communicates connection information to both the end client 2020 and the end client 2030, as illustrated in FIG. 22. The end clients 2020,2030 can utilize this information to set up a connection between one another, as illustrated in FIG. 23.

Although these communications and connections are illustrated as being generally direct (albeit preferably utilizing VDN, as described herein), in one or more preferred implementations, one or more deflects are utilized for any or all of these communications or connections. Specifically, in one or more preferred implementations, split traffic (e.g. VDN traffic with deflects) can be used between two network devices (e.g. DPS and PoE gateway or PoE gateway and VTC (Virtual Thin Client)). For example, FIGS. 24-27 illustrate the same scenario as outlined above, only with one or more deflects utilized for each communication or connection.

In one or more preferred implementations, such PoE gateways are utilized to ensure that all devices with important data and network information are behind a firewall. Further, it is believed that use of PoE gateways allows a DPS address to be obscured from network detection.

As illustrated in one or more preferred implementations, more than one PoE gateway can be utilized. In at least some preferred implementations, many PoE gateways can be used, reused and discarded easily.

The use of PoE gateways is further believed to allow system connections to be spread out over more computers, thus making a network or system harder to understand (and thus hack). Additionally, the use of PoE gateways is believed, in one or more preferred implementations, to alleviate throughput and connection limitations on a DPS, improve scaling, enable multiple points of entry, and provide points of entry that do not contain user data.

Specifically, with regard to this last point, as noted above, network attacks are a common occurrence in today's cyber environment, and computers that are not protected by firewalls are under constant attack. Servers are especially vulnerable due to the fact that they must keep a port open on a firewall to enable a connection to a client. Using computers or devices, such as PoE gateways, that do not have valuable information on them as interfaces is believed to be a useful way to protect user data.

Virtual Dispersive Hand-Off

Traditionally, network connections between different systems typically don't hand off connections smoothly or quickly. For example, as a mobile device with a WiFi connection moves from a first area, covered by a first WiFi network, to a second area, covered by a second WiFi connection, there is typically not a smooth transition from one network to the other, and instead connectivity will typically be disrupted as the first WiFi network is lost.

In one or more preferred implementations, however, VDN is utilized for a smooth hand-off. For example, with respect to the previously outlined scenario, the use of multiple virtual network connections would allow the device to connect to both WiFi networks, and enable a smooth transition as the device moves from the first area to the second area.

In one or more preferred implementations, in order to figure out which access points to connect to, several mechanisms are used. Several exemplary such mechanisms and methodologies will now be described, although it will be appreciated that this is not an exhaustive list.

In one or more preferred implementations, GPS is utilized to determine the speed and direction of a device and determine network devices in close proximity for connection.

In one or more preferred implementations, the device detects RF signal and connects to as many devices as feasible. Once connection is achieved, network presence is used to determine the connection point and move the network connection to the new access point. In one or more preferred implementations, devices can maintain a connection by using Spread Spectrum Protocol setups to "roll" the connection and continue streaming data while moving from access point to access point.

In one or more preferred implementations, by setting up deflects, routing paths and data can be forced to the next access point that a mobile device is moving toward. That is, deflects can be utilized to force traffic to a particular access point.

Figure 28:
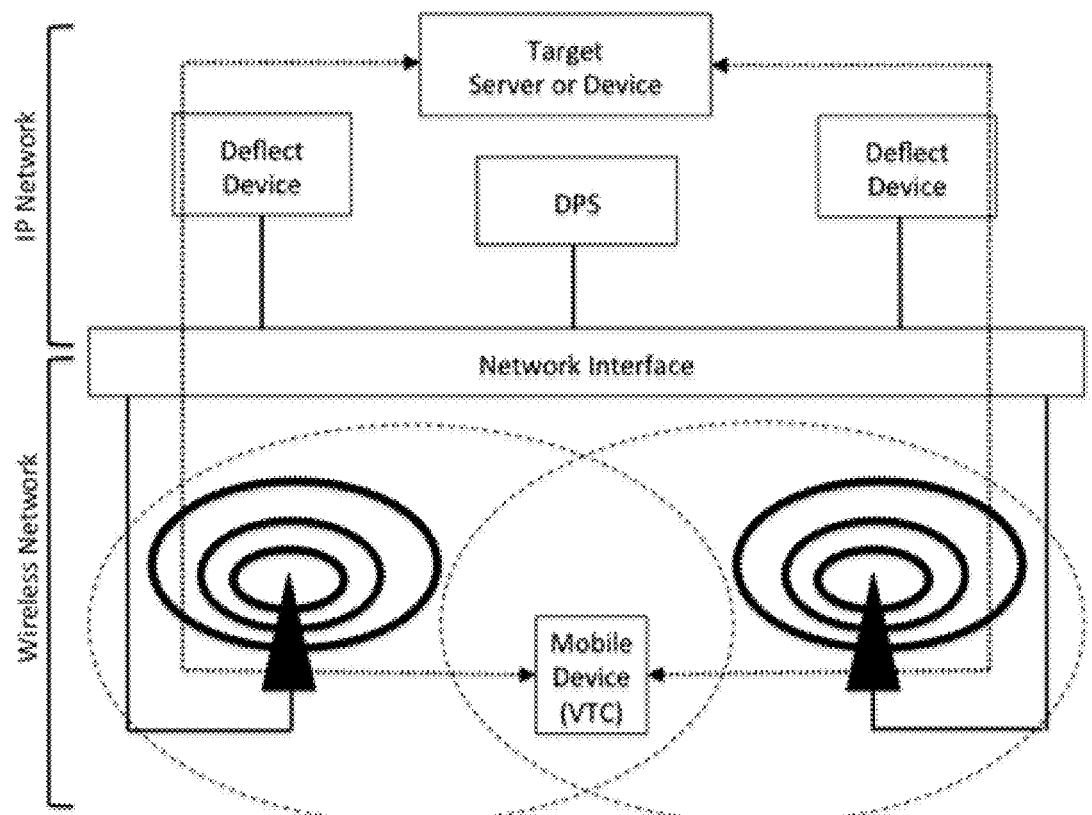
FIG. 28 illustrates the overlapping of data by sending it to a mobile device via two different wireless networks.

In some preferred implementations, data is overlapped (e.g. sent to or from the mobile device via multiple connections) to insure that communicated information has been or will be received (either by the mobile device or by a device it is being sent to by the mobile device), as illustrated in FIG. 28. In one or more preferred implementations, data intended for a mobile device can be preloaded to a deflect and extracted when the mobile device connects to the access point. In some preferred implementations, data is given a timeframe to exist on the deflect, and is removed or archived once this timeframe expires, so that the deflect is not overloaded with "old" data.

Such hand-off functionality is believed to allow for the use of WiFi devices to stream data to mobile devices while the mobile devices are moving, allow for the ability to increase the data throughput of a system, enable the use of inexpensive mobile carrier platforms (e.g. WiFi hotspots and public WiFi), maintain a connection for mobile devices across networks and access points, and force traffic (via the use of deflects) to an access point for connection to a mobile device.

Multi-Protocol Dispersion

In one or more preferred implementations utilizing VDN, a deflect simply passes data through without reformatting it. In some cases, then, VDN traffic can be detected and identified by tracking the data in and out of a deflect. In one or more preferred implementations, a deflect is configured to reformat data to another protocol (e.g. from UDP to a TCP connection) so as to obviate this potential issue. Such a change in protocol is believed to make it much more difficult for external hackers to detect VDN data and try to put it back together.

Figure 29:
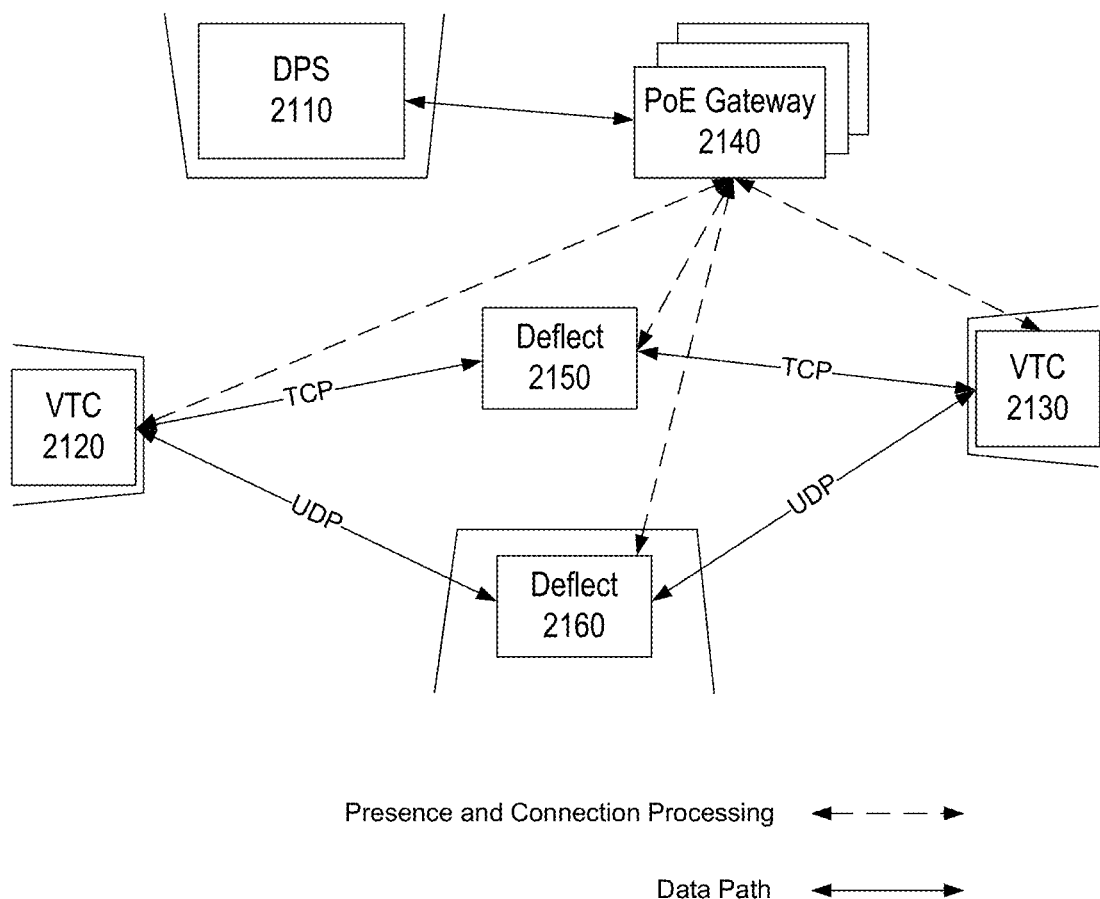
Figure 30:
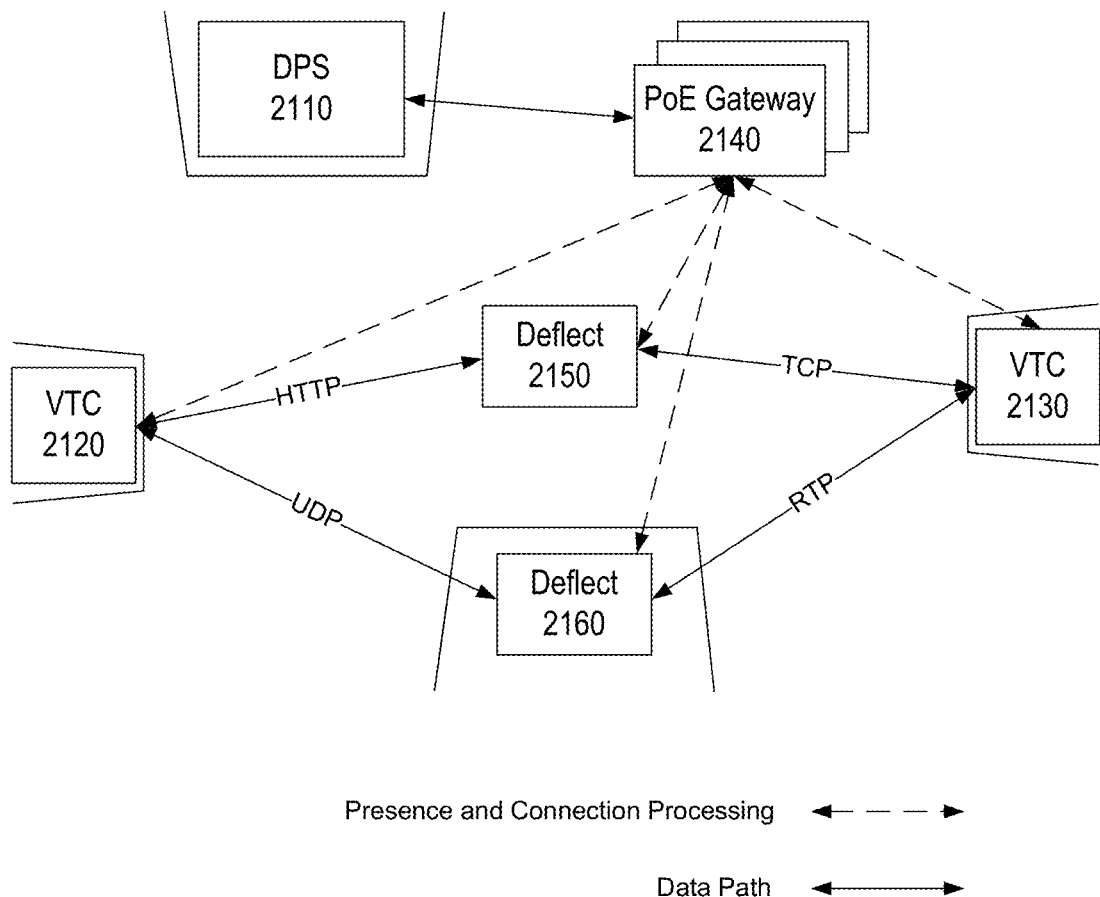
FIG. 30 illustrates a system in which deflects are configured to reformat data to another protocol.

As an example, FIGS. 29 and 30 both illustrate exemplary scenarios utilizing a system which includes, inter alia, DPS 2110, PoE gateway 2140, two virtual thin clients (VTCs) 2120,2130, and two deflects 2150,2160. Specifically, FIG. 29 illustrates VDN routing from virtual thin client (VTC) 2120 to VTC 2130 using two deflects 2150,2160 that are configured simply to pass data through. In contrast to this, FIG. 30 illustrates a system in which the deflects 2150,2160 are configured to reformat data to another protocol. In the illustrated example, the deflect 2150 reformats data from HTTP to TCP, and the deflect 2160 reformats data from UDP to RTP.

This is believed to make it very difficult for a hacker or monitoring technology to detect VDN. Additionally, this allows traffic of one type to be made to look like another.

Superframes

It will be appreciated that one or more VDN methodologies disclosed herein can be characterized as resulting in VDN traffic that goes in and out of deflects in a 1:1 relationship. That is, in accordance with such a methodology, each packet received at a deflect is subsequently routed out of the deflect. Notably, however, such VDN traffic can be detected in and out of deflects due to the 1:1 nature of the traffic.

In one or more preferred implementations, "superframes" are utilized, which represent a single packet or communication that contains two packets or communications therein, optionally together with instructions as to where each packet is bound. In one or more preferred implementations, such a superframe further includes instructions as to what device should split a superframe up.

Figure 31A:
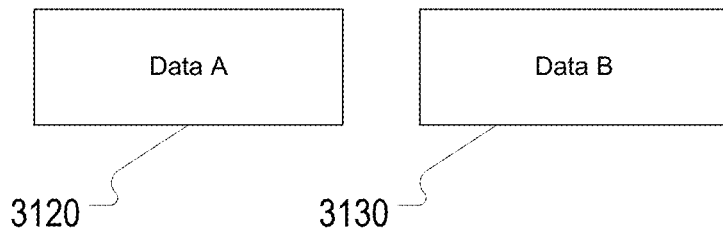
FIG. 31A illustrates a first packet which includes data A, as well as a second packet which includes data B.
Figure 31B:
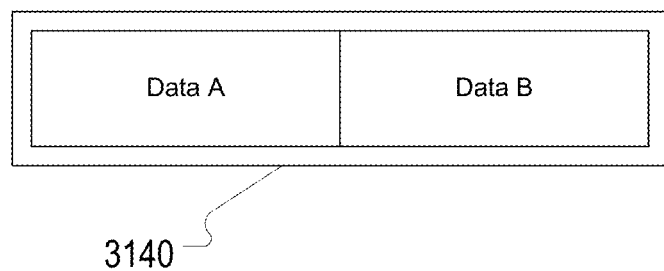
FIG. 31B illustrates a superframe which has been constructed that includes both data A and data B.
Figure 32:
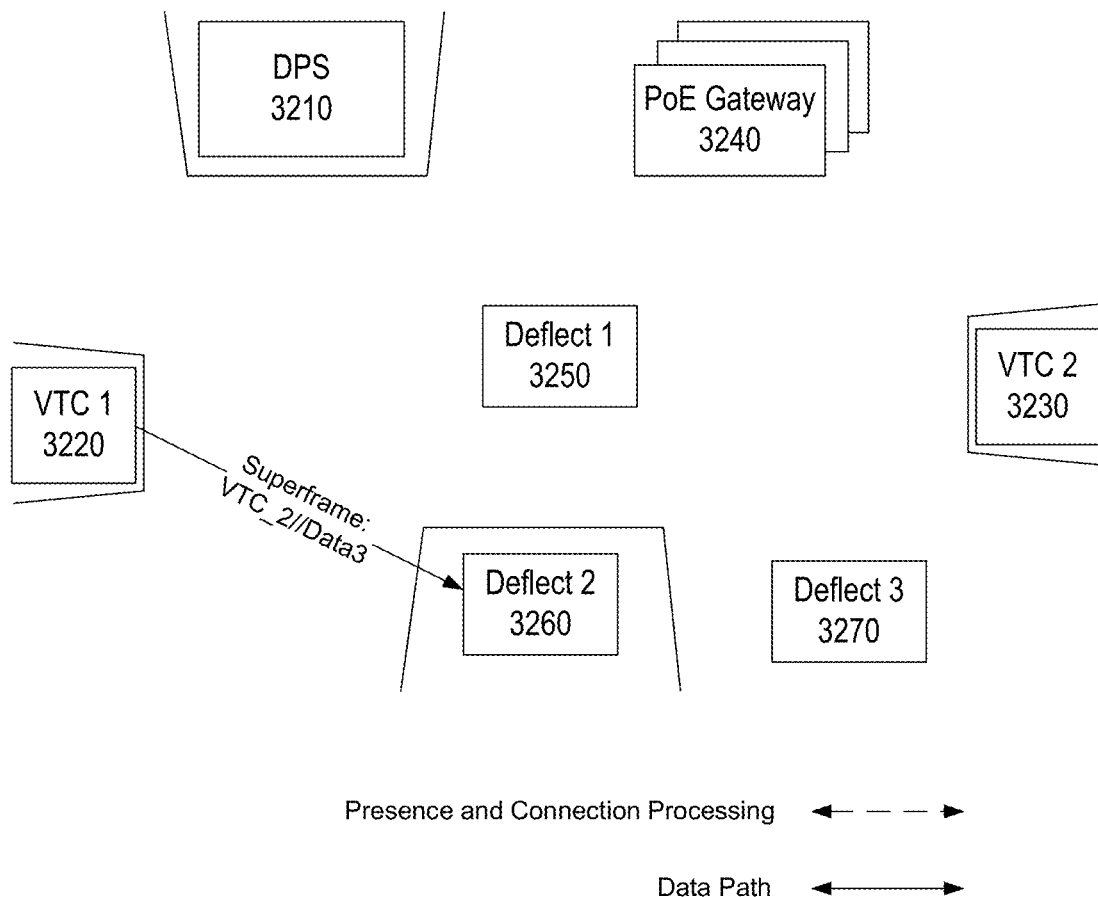
FIGS. 32-33 illustrate a process in which a superframe is sent from a first virtual thin client to a deflect.
Figure 33:
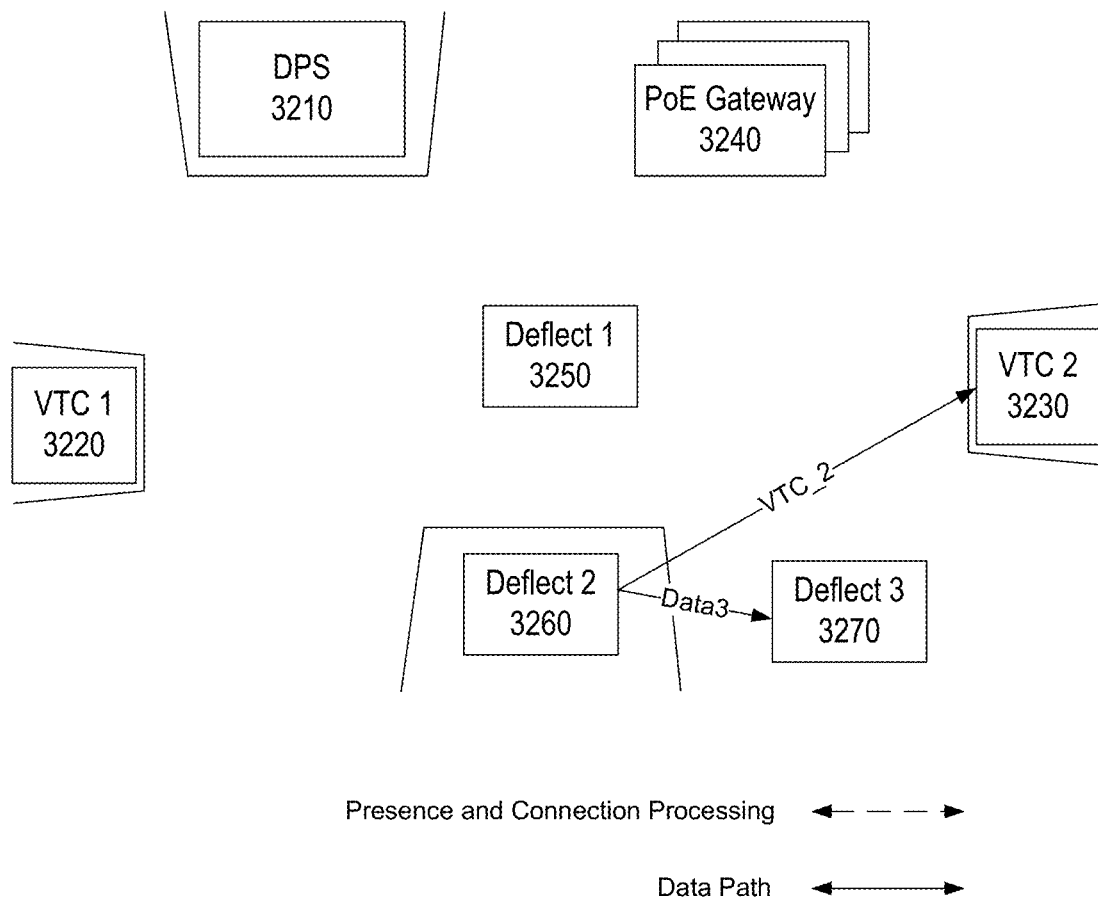

For example, FIG. 31A illustrates a first packet 3120 which includes data A, as well as a second packet 3130 which includes data B. FIG. 31B illustrates a superframe which has been constructed that includes both data A and data B. In one or more preferred implementations, such superframe also includes instructions to break apart this data, e.g. instructions as to where to send each set of data, and, preferably even instructions as to where this data should be broken apart (e.g. at a particular deflect). FIGS. 32-33 illustrate a process in which a superframe is sent from a first virtual thin client (VTC) 3220 to a deflect 3260. The second deflect breaks apart the superframe and communicates some data onward toward the second VTC 3230, and some data onward toward another deflect 3270. The deflect 3270 may then route the packet towards the second VTC 3230, or somewhere else. In one or more preferred implementations, a superframe includes instructions as to where the data contained therein is to be sent. Further, in one or more preferred implementations, a superframe includes instructions as to where it is to be broken apart.

Although in the illustrated example the data packets the superframe was broken into were communicated onward towards different devices, in one or more preferred implementations a superframe is broken up but both packets continue to be routed along the same path.

Figure 34:
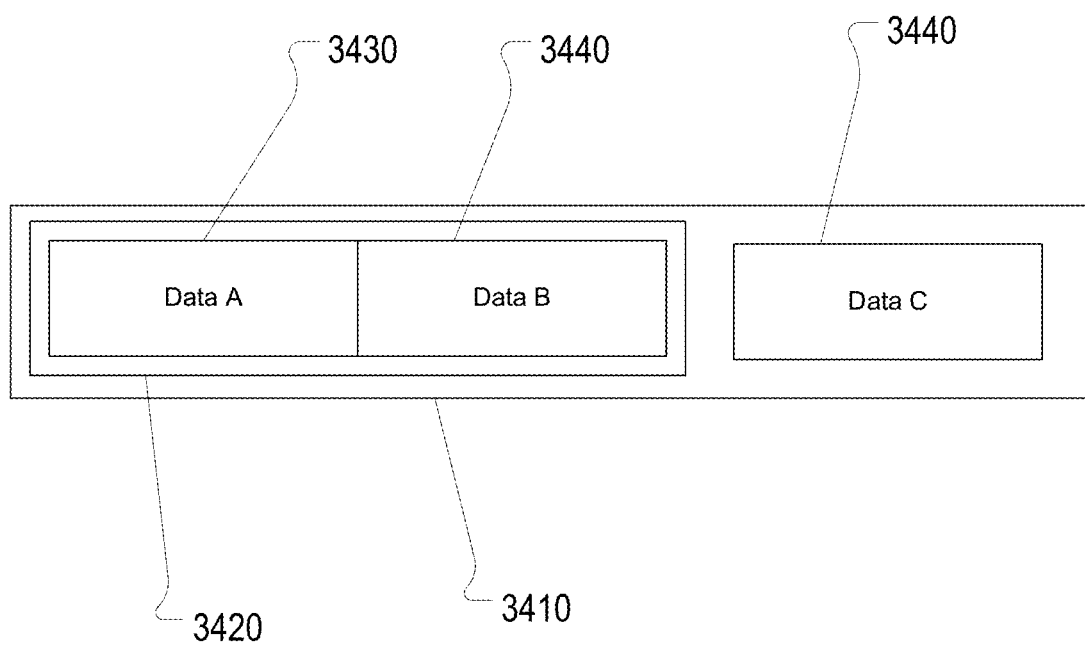
FIG. 34 illustrates a superframe which itself includes a superframe (which includes two packets) as well as a packet.

Further, although illustrated and described with reference to a superframe containing two packets or sets of data, in one or more preferred implementations a superframe may contain three or more packets or sets of data, which may be bound for different destinations or the same destination, and may travel the same route or path, or may travel different routes or paths. Further, in one or more preferred implementations, a superframe might include other superframes nested therein. For example, FIG. 34 illustrates a superframe 3410 which itself includes a superframe 3420 (which includes two packets 3430,3440) as well as a packet 3440.

Thus, a deflect can be used as a tool to split a large frame or pack into multiple packets and forward the split packets to other deflects and/or one or more final destination computing devices.

The use of superframes is believed to facilitate making it very difficult for a hacker or monitoring technology to detect VDN.

Additionally, superframes can be utilized to facilitate the broadcasting of data to other devices. For example, this could be utilized in support of one to many type applications.

Application Split Traffic

Figure 35:
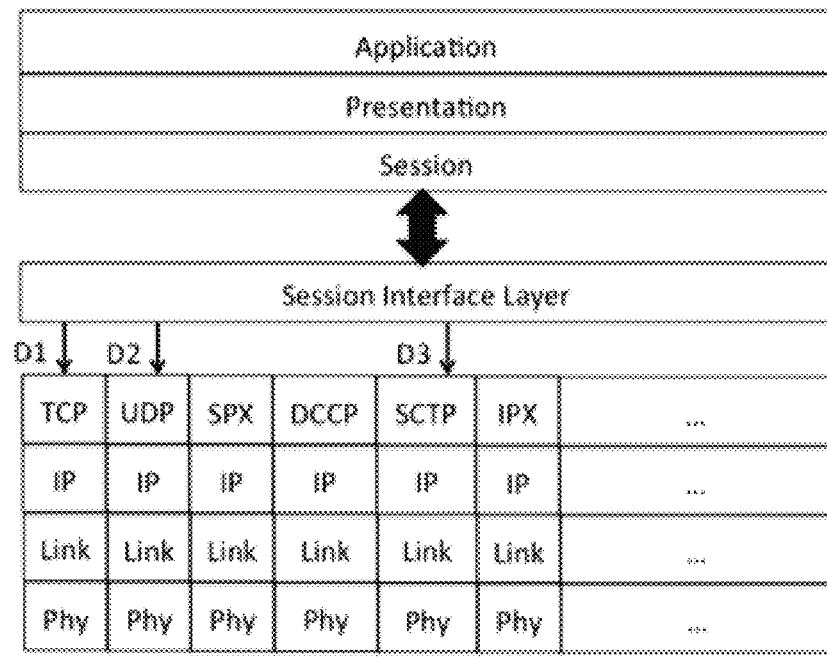
FIG. 35 illustrates how communications are intercepted at the session layer and parsed out to a plurality of links.

Typically, applications need to keep track of connection state to operate and suffer when network connections are poor. In one or more preferred implementations, virtualization is utilized to insulate an application from IP address and network connection duties, which enables the splitting of traffic over multiple links. Preferably, communications are intercepted at the session layer and parsed out to each link, as illustrated in FIG. 35. For example, traffic from an application can be split up and parsed out, at the session layer, to a plurality of different virtual connections. Data received over these connections can similarly be reconstructed and passed up to the application. Notably, a connection can be converted to other protocols for diversity.

This not only provides the ability to split traffic of a connection, but additionally provides the ability to setup channels to roll a VDN spread spectrum connection, as well as the ability to hide networking information.

Priority Through Time Measurement

Conventionally, priority of packets through a network is primarily accomplished by marking or labeling a packet high priority. Unfortunately, this does not guarantee a fast transfer of data from end to end. For example, not all routers are able to handle or have been setup to handle special packet markings.

In one or more preferred implementations, VDN is utilized to provide better end to end quality of service (QoS) without resorting to labeling or marking packets (although it will be appreciated that methodologies disclosed herein could be utilized in combination with labeling or marking packets).

Figure 36:
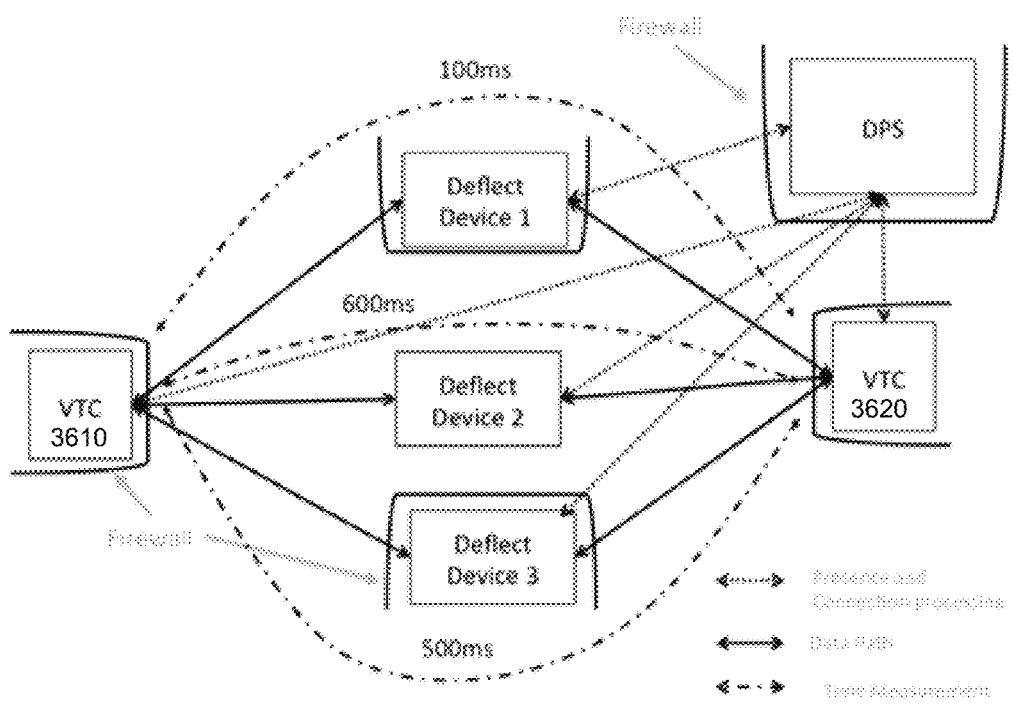
FIG. 36 illustrates a plurality of data paths from a first end device to a second end device.

In one or more preferred implementations, a system that can message at the lowest level in the stack can determine the time it takes for packets to move from end to end. For example, as illustrated in FIG. 36, first and second end devices 3610,3620 can determine that it takes 100 ms to communicate from one end to another through a first deflect, 600 ms to communicate from one end to another through a second deflect, and 500 ms to communicate from one end to another through a third deflect.

Thus, in this scenario, higher priority traffic from the first end device 3610 to the second end device 3620 could be given priority by being routed via the first deflect, while lower priority traffic could be routed via the second and third deflects.

More generally, if multiple paths are available, end devices can find network connections that give faster end to end throughput and use of such routes and connections can be allocated, prioritized, and/or reserved to devices that can be designated to require higher throughput, such as, for example, emergency management, police, fire, military or other high priority customers and decision makers. Users without as high of priority could have a threshold set of a mid-range time as a minimum thereby keeping the faster routes available for the higher priority calls but still enabling the system to enable connections. By choosing connections with shorter time to send and receive packets, the parallel connection can actually speed up data being sent between the end points.

In one or more preferred implementations, end devices are designated with a particular priority level, which might represent an arbitrary designation or could simply represent a minimum and/or maximum threshold time.

In one or more preferred implementations, an end device determines the time it takes packets to travel to a particular destination over several different routes, and selects a route in accord with its priority level. For example, returning to the example illustrated in FIG. 1, the end device 3610 might have a priority level setting a minimum threshold at 300 ms, and would accordingly limit its communications to use of the second and third deflects (at 600 ms and 500 ms respectively), thereby reserving use of the first deflect (corresponding to a 100 ms travel time) to higher priority devices/communications.

In one or more preferred implementations, priority designations or minimum or maximum thresholds may be set at an application or connection level rather than on a per device basis, and/or particular applications and/or connections may deviate from a device level priority designation or minimum or maximum threshold.

In one or more preferred implementations, priority provision based on time measurement is believed to provide the ability to give priority to packets without requiring a change to current packets, the ability to give service to lower priority connections without jeopardizing higher speed connections, the ability to dynamically set time thresholds, the ability to give individual devices extremely high priority, allow for measurement corresponding to end to end priority and quality of service rather than simply measuring the speed through an individual router.

Multi-Layer Deflects

Systems in which a dispersive presence server (DPS) downloads a spread spectrum protocol (SSP) to a plurality of virtual thin clients (VTCs) are disclosed herein. In exemplary such systems, a VTC can connect to a deflect that is either specified or chosen from a pool of deflects. Such a deflect can be behind or in front of a firewall. The deflect then connects to a destination or final VTC. Further, in one or more preferred implementations, a VTC can itself be a deflect (for example, a third VTC can be utilized as a deflect for communications from a first VTC to a second VTC).

Figure 37:
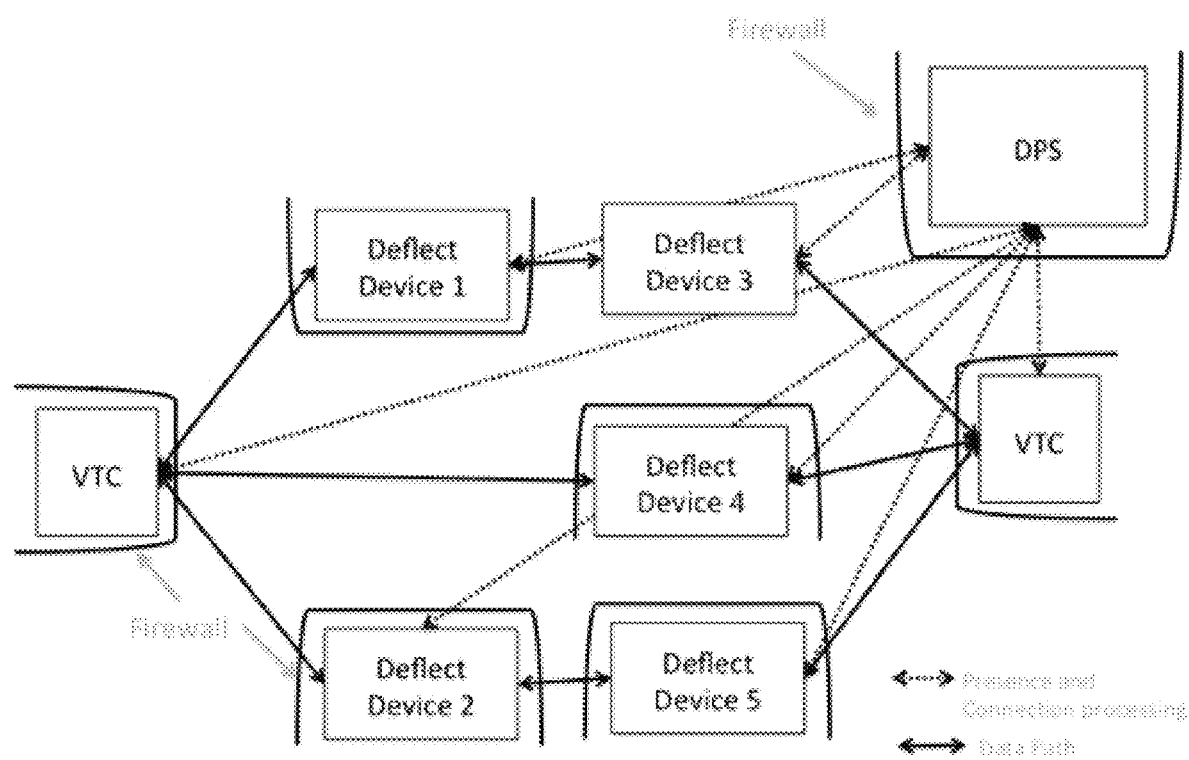
FIG. 37 illustrates several data paths that pass through multiple deflects.

In one or more preferred implementations, rather than simply using one deflect along any communication route from a source end point to a destination end point, a SSP setup calls out for multi-layers of deflects. For example, FIG. 37 illustrates several data paths that pass through multiple deflects, including a first communication path that passes through deflect device 1 and deflect device 3, and a second communication path that passes through deflect device 2 and deflect device 5. Although only two layers of deflects are illustrated, in one or more preferred implementations more than two layers of deflects may be utilized.

Moreover, multi-layer deflect implementations can utilize the same deflect multiple times. In one or more preferred implementations, a loop is even set up between two or more deflects whereby data is continually looped between such deflects. In one or more preferred implementations, data is stored in a network by being looped continuously between deflects. In theory, such data could be stored indefinitely in the network.

In preferred implementations, VTCs are utilized as deflects to make it more difficult to separate traffic originating or terminating at that VTC from traffic for which that VTC is a deflect.

Further, the use of deflects, and multi-layer deflects, is believed to facilitate obscuring of source and destination IP address information.

VDN Casting

Most communication paths and networks are not 100% reliable. Some communication paths will not be available all of the time. In one or more preferred implementations, VDN casting is utilized to find a way to reach a VTC over varied communication paths.

At times, a destination VTC may be in an area that has limited communication or sporadic communication. In this and similar situations, another VTC can test deflects for connection to the destination VTC. A virtual dispersive network (VDN) can be rather large, but since the members of a VDN keep track of connection information (even though a dispersive presence server may lose connectivity), the network can still communicate as long as the network has not change significantly and the destination VTC address had not changed.

Figure 38:
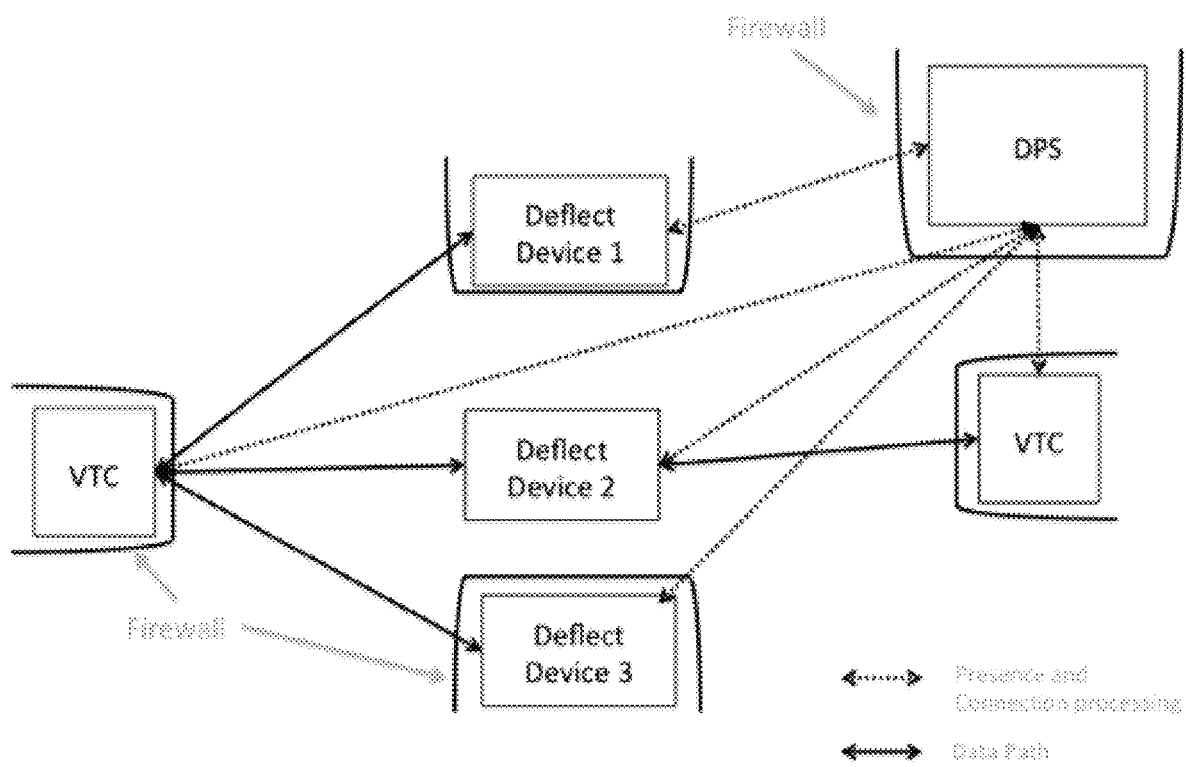
FIG. 38 illustrates how a connection from a first VTC to a second VTC through a second deflect is still possible even though it is not possible to connect through a first or third deflect.

FIG. 38 illustrates how a connection from a first VTC to a second VTC through a second deflect is still possible even though it is not possible to connect through a first or third deflect.

In one or more preferred implementations, VDN casting is believed to facilitate making a network delay tolerant, and allow network devices to be found at later points in time.

Based on the foregoing description, it will be readily understood by those persons skilled in the art that the invention is susceptible of broad utility and application. Embodiments and adaptations of the invention other than those specifically described herein, as well as many variations, modifications, and equivalent arrangements, will be apparent from or reasonably suggested by the invention and the foregoing descriptions thereof, without departing from the substance or scope of the invention. Accordingly, while the invention has been described herein in detail in relation to one or more preferred embodiments, it is to be understood that this disclosure is only illustrative and exemplary of the invention and is made merely for the purpose of providing a full and enabling disclosure of the invention. The foregoing disclosure is not intended to be construed to limit the invention or otherwise exclude any such other embodiments, adaptations, variations, modifications or equivalent arrangements, the invention being limited only by the claims appended hereto and the equivalents thereof.

What is claimed is:

1. A method comprising:
   (a) at a first device for a packet to be sent to a destination device,
      (i) constructing a first superframe packet encapsulating the packet, the first superframe packet including a first superframe instruction identifying a second device to communicate the encapsulated packet to;
      (ii) constructing a second superframe packet containing the first superframe packet, the second superframe packet including a second superframe instruction identifying a third device to communicate the first superframe packet to; and
   (b) communicating the packet from the first device to the destination device, including
      (i) receiving, at a fourth device, the second superframe packet communicated from the first device,
      (ii) breaking apart, at the fourth device, the second superframe packet to obtain the first superframe packet,
      (iii) determining, at the fourth device based on the second superframe instruction, that the first superframe packet is to be communicated to the third device,
      (iv) communicating, from the fourth device, the first superframe packet for communication to the third device,
      (v) receiving, at the third device, the first superframe packet communicated from the fourth device,
      (vi) breaking apart, at the third device, the first superframe packet to obtain the packet,
      (vii) determining, at the third device based on the first superframe instruction, that the packet is to be communicated to the second device,
      (viii) communicating, from the third device, the first superframe packet for communication to the second device,
      (ix) receiving, at the second device, the packet communicated from the third device,
      (x) communicating, from the second device, the packet for communication to the destination device.

2. The method of claim 1, further comprising transmitting a first message from the first device to a control device, the first message including an identifier of the first device and an Internet Protocol (IP) prefix associated with the first device.

3. The method of claim 1, wherein the first device comprises a first edge network device in a first internal network domain.

4. The method of claim 1, wherein the destination device is associated with a second internal network domain.

5. The method of claim 1, wherein the second device is a border network device.

6. The method of claim 1, wherein the first device comprises a first edge network device in a first internal network domain, the destination device is associated with a second internal network domain, and the second device is a border network device located at the border of the second internal network domain and a third network domain located between the first internal network domain and the second internal network domain.

7. The method of claim 1, wherein the third device is a border network device.

8. The method of claim 1, wherein the first device comprises a first edge network device in a first internal network domain, the destination device is associated with a second internal network domain, and the third device is a border network device located at the border of the first internal network domain and a third network domain located between the first internal network domain and the second internal network domain.

9. The method of claim 1, wherein the first device comprises a first edge network device in a first internal network domain, the destination device is associated with a second internal network domain, and the second device is a border network device located at the border of the second internal network domain and a third network domain located between the first internal network domain and the second internal network domain, and the third device is a border network device located at the border of the first internal network domain and the third network domain located between the first internal network domain and the second internal network domain.

10. The method of claim 9, further comprising: determining availability of each of a first plurality of path segments through the first internal network domain; determining availability of each of a second plurality of path segments through the second internal network domain; and determining availability of each of a third plurality of path segments through the third network domain.

11. The method of claim 10, further comprising: selecting a first path segment from the first plurality of path segments based on the first path segment being available; selecting a second path segment from the second plurality of path segments based on the second path segment being available; and selecting a third path segment from the third plurality of path segments based on the third path segment being available.

12. The method of claim 11, wherein selecting the first path segment is further based on network performance of the first path segment.

* * * * *